(12) United States Patent
Ma et al.

(10) Patent No.: US 12,312,495 B2
(45) Date of Patent: May 27, 2025

(54) SILANOL COMPOSITIONS AND METHODS OF USE

(71) Applicant: 3M INNOVATIVE PROPERTIES COMPANY, St. Paul, MN (US)

(72) Inventors: Jun Ma, Woodbury, MN (US); Naiyong Jing, St. Paul, MN (US); Moses M. David, Wells, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 790 days.

(21) Appl. No.: 17/284,521

(22) PCT Filed: Oct. 8, 2019

(86) PCT No.: PCT/IB2019/058570
§ 371 (c)(1),
(2) Date: Apr. 12, 2021

(87) PCT Pub. No.: WO2020/079530
PCT Pub. Date: Apr. 23, 2020

(65) Prior Publication Data
US 2021/0340404 A1    Nov. 4, 2021

Related U.S. Application Data

(60) Provisional application No. 62/902,606, filed on Sep. 19, 2019, provisional application No. 62/747,254, filed on Oct. 18, 2018.

(51) Int. Cl.
| | | |
|---|---|---|
| C07F 7/08 | (2006.01) | |
| C07F 9/38 | (2006.01) | |
| C08G 77/54 | (2006.01) | |
| C09D 5/00 | (2006.01) | |
| C09D 183/14 | (2006.01) | |
| C03C 17/30 | (2006.01) | |

(52) U.S. Cl.
CPC .......... C09D 183/14 (2013.01); C07F 7/0836 (2013.01); C07F 9/3817 (2013.01); C07F 9/3873 (2013.01); C08G 77/54 (2013.01); C09D 5/00 (2013.01); C03C 17/30 (2013.01); C03C 2217/76 (2013.01)

(58) Field of Classification Search
CPC .... C07F 7/0836; C07F 9/3817; C07F 9/3873; C07F 9/092; C08G 77/54; C09D 183/14
See application file for complete search history.

(56) References Cited

U.S. PATENT DOCUMENTS

| | | |
|---|---|---|
| 9,340,562 B1 | 5/2016 | Liu |
| 9,340,683 B2 | 5/2016 | Jing |
| 9,518,245 B2 | 12/2016 | Gardner, Jr. |
| 9,527,336 B2 | 12/2016 | Mahli |
| 9,567,354 B2 | 2/2017 | Tonomura |
| 10,160,868 B2 | 12/2018 | Jing |
| 2013/0164730 A1 | 6/2013 | Gustafson |
| 2014/0088279 A1* | 3/2014 | Wolter ..................... C08F 30/08 556/419 |
| 2016/0222223 A1 | 8/2016 | Jing |
| 2017/0045284 A1 | 2/2017 | Meuler |
| 2018/0037767 A1 | 2/2018 | Zhang |
| 2020/0230034 A1 | 7/2020 | Yoshioka |
| 2020/0329711 A1 | 10/2020 | Liang |
| 2023/0183493 A1* | 6/2023 | Gustafson ............ C09D 183/08 434/408 |

FOREIGN PATENT DOCUMENTS

| | | | |
|---|---|---|---|
| CN | 102723528 A | * | 10/2012 |
| CN | 107987722 | | 5/2018 |
| CN | 108003327 A | * | 5/2018 |
| EP | 3194517 | | 7/2017 |
| JP | 5980205 | | 8/2016 |
| JP | 2018062500 | | 4/2018 |
| WO | WO 2001-066820 | | 9/2001 |
| WO | WO 2011-084661 | | 7/2011 |
| WO | WO 2011-094342 | | 8/2011 |
| WO | WO 2011-163175 | | 12/2011 |
| WO | WO 2013-102099 | | 7/2013 |
| WO | WO 2014-209832 | | 12/2014 |
| WO | WO 2015-143163 | | 9/2015 |
| WO | WO 2015-143262 | | 9/2015 |
| WO | WO 2016-044082 | | 3/2016 |
| WO | WO-2017214491 A1 * | | 12/2017 ........... A61K 31/695 |

(Continued)

OTHER PUBLICATIONS

1(5) ACS applied materials & interfaces 1002-1012 (2009 (Year: 2009).*
Azizi, "Highly chemoselective addition of amines to epoxides in water", Organic Letters 2005, vol. 7, No. 17, pp. 3649-3651.
Chen, "Cross-linked zwitterionic polyelectrolytes based on sulfonated poly(ether sulfone) with high proton conductivity for direct methanol fuel cells," Journal of Power Sources, 2012, vol. 212, pp. 13-21.
Darrow, "Cyclic phosphonate analogs of hexopyranoses", Journal of Organic Chemistry, 1994, vol. 59, pp. 2976-2985.
Ng, "Sulfonic acid functionalized MCM-41 as solid acid catalyst for tert-butylation of hudroquinone enhanced by microwave heating," Applied Catalysis A: General, 2012, vol. 450, pp. 34-41.

(Continued)

*Primary Examiner* — Alexander R Pagano
*Assistant Examiner* — Frank S. Hou
(74) *Attorney, Agent, or Firm* — Jeffrey M. Olofson

(57) ABSTRACT

Described herein are compositions including a silanol compound that is suitably synthesized, stored, and coated from an aqueous solution. Once coated and cured on a suitable surface, the aqueous silanol compositions result in cleanable and abrasion resistant surfaces, such as dry-erase surfaces that release permanent marker by rubbing with a dry cloth or towel. Also disclosed herein are methods of making the silanol compounds, methods of making cleanable substrates, and cleanable substrates suitably formed using the disclosed methods.

18 Claims, No Drawings

(56) References Cited

FOREIGN PATENT DOCUMENTS

WO    WO 2018-052719    3/2018

OTHER PUBLICATIONS

International Search report for PCT International Application No. PCT/IB2019/058570 mailed on Feb. 27, 2020, 6 pages.
B. Tripathi et al., 1(5) ACS Applied Materials & Interfaces 1002-1012 (2009).

* cited by examiner

SILANOL COMPOSITIONS AND METHODS OF USE

CROSS REFERENCE TO RELATED APPLICATIONS

This application is a national stage filing under 35 U.S.C. 371 of PCT/IB2019/058570, filed 8 Oct. 2019, which claims the benefit of U.S. Provisional Application No. 62/747,254, filed 18 Oct. 2018 and U.S. Provisional Application No. 62/902,606, filed 19 Sep. 2019, the disclosures of which are incorporated by reference in their entireties herein.

FIELD OF THE DISCLOSURE

The present disclosure generally relates to silanol compositions, methods of making the compositions, methods of applying the compositions to one or more surfaces to form cleanable surfaces, articles including the silanol compositions, articles having cleanable surfaces, and methods of using articles having cleanable surfaces.

BACKGROUND

Articles having cleanable surfaces have been made from a variety of materials offering various combinations of properties. For example, so-called "dry erase" surfaces, typically manufactured commercially in flat board formats, have been used as cleanable, rewritable surfaces for years because of their ease of use and versatility. Ideally, such boards enable a user to mark the dry erase surface with a felt-tip marker pen, then wipe the surface clean in fashion similar to erasing chalk from a chalk board, for example by wiping with a cloth, eraser, or the like. In this sense, such boards provide means to display temporary markings in a way that is cleaner and more convenient than using chalk on a blackboard and yet is less expensive and simpler than rewritable digital surfaces.

The convenience and low cost of dry erase surfaces have led to broad market adoption of dry erase technology. Yet some dry erase surfaces remain associated with issues of poor cleanability and/or poor durability to multiple cleaning/rewriting cycles. Conventional glass and porcelain surfaces are easily marked with specially formulated "dry erase markers" which may then be easily wiped away (e.g. with a cloth or a "dry eraser" for erasing dry erase marker ink) without the use of a solvent soon after marking, such as after one day. However, the dried ink compositions build adhesion to such surfaces over time, becoming difficult or even impossible to remove without use of a solvent.

This problem is also closely associated with the surfaces of non-vitreous dry erase boards. Further, it is often observed with non-vitreous dry erase surfaces that over time, dried ink becomes partially removable without solvent, leaving a dirty-looking surface. This common observation is referred to in the industry as "ghosting." Non-vitreous dry erase board surfaces are formed from a variety of materials including films, coatings, coated films, film laminates, and coated film laminates; and combinations of these with one or more support layers of e.g. paper or cardboard, metal such as aluminum or steel, or thermoplastic/thermoset materials such as melamine. The one or more support layers are designed and adapted to provide robustness and stiffness sufficient to facilitate writing actions.

Further, so-called "permanent" marker ink (such as ink found in SHARPIE® pens sold by Newell Brands of Atlanta, GA) tends to adhere quickly and tightly to both vitreous and non-vitreous surfaces. This is commensurate with the stated purpose of such ink. Dry erase surfaces marked with permanent ink—which frequently occurs by accident—may be permanently stained or may require the use of solvents such as isopropanol to remove the ink. Isopropanol and other VOCs are presently being replaced with aqueous formulations in the marketplace. Thus, cleaning compositions for dry erase boards may include water and surfactants, often with a minor amount of a water miscible solvent having a vapor pressure that is lower than the vapor pressure of water. Such cleaners are preferable from an environmental, health, and safety standpoint but are usually much less effective at cleaning the dry erase surface compared to solvents such as isopropanol. Further, such cleaners are often ineffective for removing permanent marker ink from dry erase boards.

Zwitterionic trialkoxysilane coupling agents, and uses thereof to make cleanable surfaces, are described in U.S. Pat. No. 9,527,336. Such coupling agents work in relation to the foregoing applications as well as related uses for making and using cleanable surfaces. The silane treated surfaces exhibit the desired cleanability and durability/abrasion resistance. However, it is well known that trialkoxysilane coupling agents must be stored in a non-aqueous solvent to prevent hydrolysis and condensation of the silane moieties prior to the intended use. The alcohol corresponding to the alkoxy groups in the trialkoxysilane compound is typically employed as solvent; thus, ethanol or methanol are the solvents of choice for storage and delivery of triethoxysilane and trimethoxysilane compounds, respectively.

SUMMARY

The inventors of the present disclosure have discovered that there is a continuing need for cleanable, rewritable surfaces that exhibit excellent receptivity to writing with a variety of writing instruments under a variety of conditions while also providing robust, durable dry erase performance. There is a need for such surfaces to have improved cleanability and low ghosting properties.

Further, the inventors of the present disclosure recognized that it would be advantageous to formulate dry erase coatings or materials that employ water as a solvent instead of an alkanol for environmental as well as health and safety reasons. In particular it would be advantageous to avoid the use of methanol as a solvent due to its toxicity. And there is a need to form such surfaces using compounds that are stable in aqueous solutions or dispersions to enable aqueous storage.

Further, the inventors of the present disclosure recognized that there is a further need to manufacture such surfaces employing aqueous methodology.

To address at least some of the needs described herein, the inventors of the present disclosure invented a composition comprising water and a silanol compound having the structure

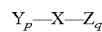

wherein Y is $[(R^1O)_iR^2_j Si]$, each $R^1$ is independently hydrogen, methyl, or ethyl, each $R^2$ is independently an alkyl group having 1 to 6 carbons, i is an integer between 1 and 3, j is an integer between 0 and 2, and i+j=3; Z is $[N(R^3)(R^4)—(CH_2)_m—C(G^1_a)-G^2_b]$ wherein each $G^1$ is independently selected from H and OH and each $G^2$ is independently selected from $SO_3$, $OSO_3$, $PO_3$, $CO_2$, or a partially or fully protonated form thereof, or a salt thereof, a is 0 to 2, b is 1-2, and a+b=3; and further wherein $R^3$ is hydrogen or an alkyl, aryl, or alkaryl group having 1 to 18 carbons, $R^4$ is an electron pair that is uncoordinated or is coordinated to a hydrogen atom, and m is an integer between 2 and 10; p and q are independently integers having a value of 1 to 1000, further wherein the ratio of p:q is between 2:1 and 1:10; each of p moieties Y is the same or different, and each of q moieties Z is the same or different; and X is a linking group comprising covalent bonds linking one or more moieties Y to one or more moieties Z.

In some embodiments, at least one $R^1$ is hydrogen. In some embodiments, all or substantially all $R^1$ are hydrogen. In some embodiments, $R^2$ is methyl. In some embodiments, $R^3$ is hydrogen. In some embodiments, $R^3$ is alkyl, aryl, or alkaryl group having 1 to 8 carbons. In some embodiments, $R^4$ is an electron pair that is coordinated to a hydrogen atom. In some embodiments, m is 2 or 3. In some embodiments, p and q both have values between 1 and 10. In some embodiments, p and q both have a value of between 1 and 5. In some embodiments, the ratio of p:q is between 2:1 and 1:2 or between 1:1 and 1:2. In some embodiments, p is 1 and q is 1.

The structure $Y_p$—X—$Z_q$ includes at least one covalent bond between X and one Y; and at least one covalent bond between X and one Z. In some embodiments, more than one Y is bonded covalently to X; in some embodiments, all Y are bonded covalently to X. In some embodiments, more than one more than one Z is bonded covalently to X; in some embodiments, all Z are bonded covalently to X. In some embodiments, more than one Y and more than one Z are bonded covalently to X; in some embodiments, all Y and all Z are bonded covalently to X. In some embodiments, there is exactly one Y bound to X. In some embodiments, there is exactly one Z bound to X. In some embodiments, there is exactly one Y and exactly one Z bound to X. Any of these embodiments can be suitably employed in the aqueous solutions herein to provide one or more cleanable surfaces.

In some embodiments, linking group X is a hydrocarbyl group having 1 to 20 carbons. In some embodiments, X further includes one or more oxygen or nitrogen atoms. When X includes one or more oxygen atoms, the one or more oxygen atoms most often interrupt the hydrocarbyl group, are present as pendant hydroxy groups, or both.

Also disclosed herein are compositions comprising water and a silanol compound. In some embodiments, one or more silanol compounds are present in a silanol composition at about 100 ppm to about 50% total by weight of the composition. In some embodiments the compositions further comprise an adjuvant such as, for example, a silicate.

Also disclosed herein are methods of making cleanable substrates, comprising coating a silanol composition as described herein on a reactive surface; and heating the coated surface to a temperature of about 50° C. to about 200° C. for about 1 second to about 5 hours. In some embodiments, the reactive surface comprises a diamond-like glass.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the disclosure. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used herein, the terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

When used to describe an element, the term "independently" means that the identity of each instance of the element is unrelated to the identity of other instances of the element. For example, if element E can be independently selected from species A and B, then element E-E may be A-A, A-B, B-A, or B-B.

The term "silanol" is used to include both compounds having one or more Si—OH moieties as well those having Si-OAlk (wherein Alk is alkyl) moiety, such as Si—O-methyl, Si—O-ethyl, and the like, that are readily hydrolysable into Si—OH moieties in aqueous fluid having a pH appropriate for such hydrolysis.

DISCUSSION

Described herein is a silanol compound having the structure $$Y_p\text{—}X\text{—}Z_q$$

wherein Y is $[(R^1O)_iR^2_j Si]$, each $R^1$ is independently hydrogen, methyl, or ethyl, each $R^2$ is independently an alkyl group having 1 to 6 carbons, i is an integer between 1 and 3, j is an integer between 0 and 2, and i+j=3; Z is $[N(R^3)(R^4)\text{—}(CH_2)_m\text{—}C(G^1_a)\text{-}G^2_b]$ wherein each $G^1$ is independently selected from H and OH and each $G^2$ is independently selected from $SO_3$, $OSO_3$, $PO_3$, $CO_2$, or a protonated or salt form thereof, a is 0 to 2, b is 1-2, and a+b=3; and further wherein $R^3$ is hydrogen or an alkyl, aryl, or alkaryl group having 1 to 18 carbons, $R^4$ is an electron pair that is uncoordinated or is coordinated to a hydrogen atom, and m is an integer between 2 and 10; p and q are independently integers having a value of 1 to 1000, further wherein the ratio of p:q is between 2:1 and 1:10; each of p moieties Y is the same or different, and each of q moieties Z is the same or different; and X is a linking group comprising covalent bonds linking one or more moieties Y to one or more moieties Z.

In some embodiments, one or more silanol compounds have a structure corresponding to one of the following exemplary but non-limiting structures 1-21, or a partially or fully protonated form thereof, or a salt thereof:

1
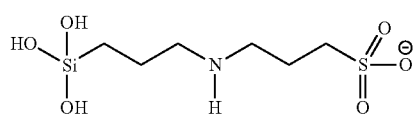

2
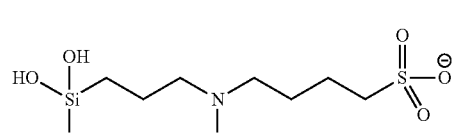

3
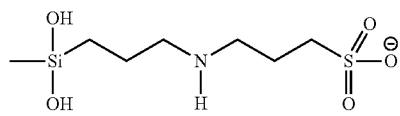

4
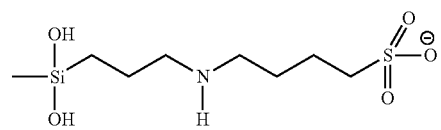

5
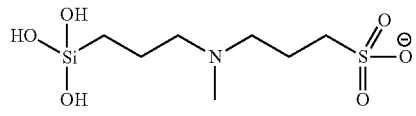

6
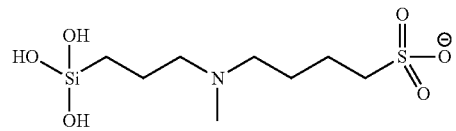

7
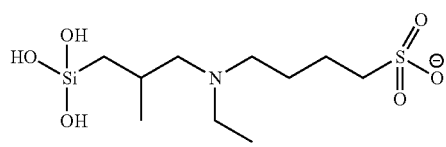

8
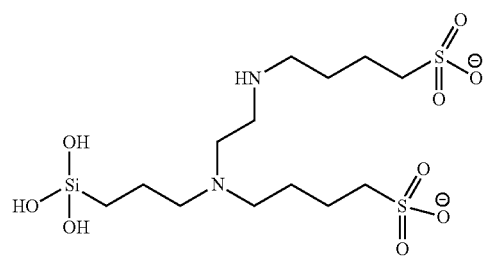

9
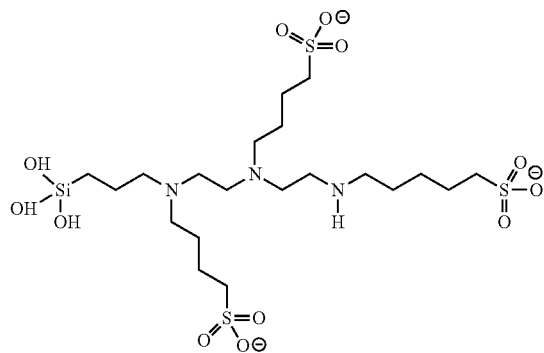

10
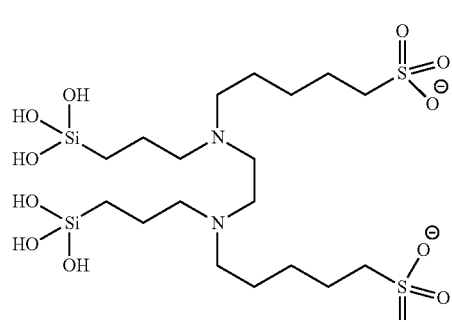

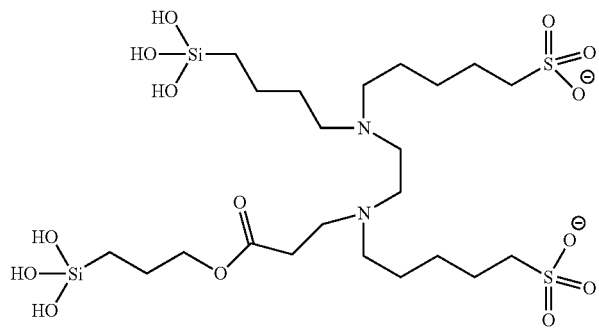
11
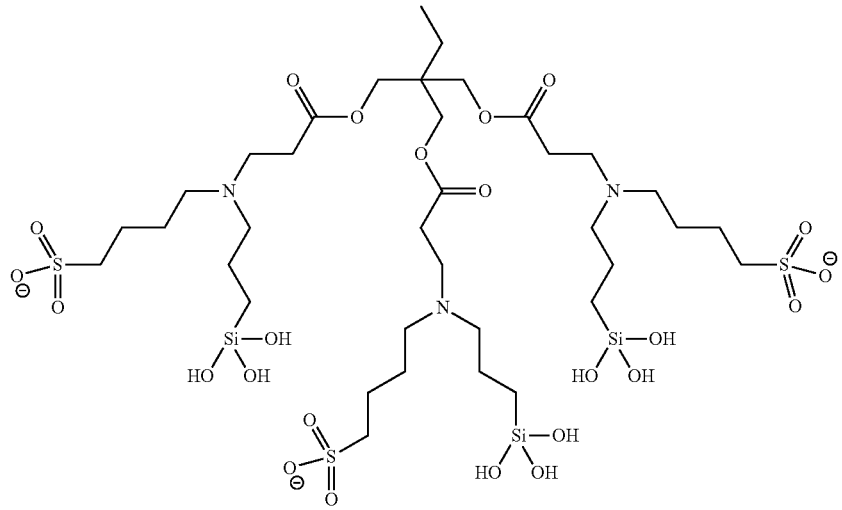
12
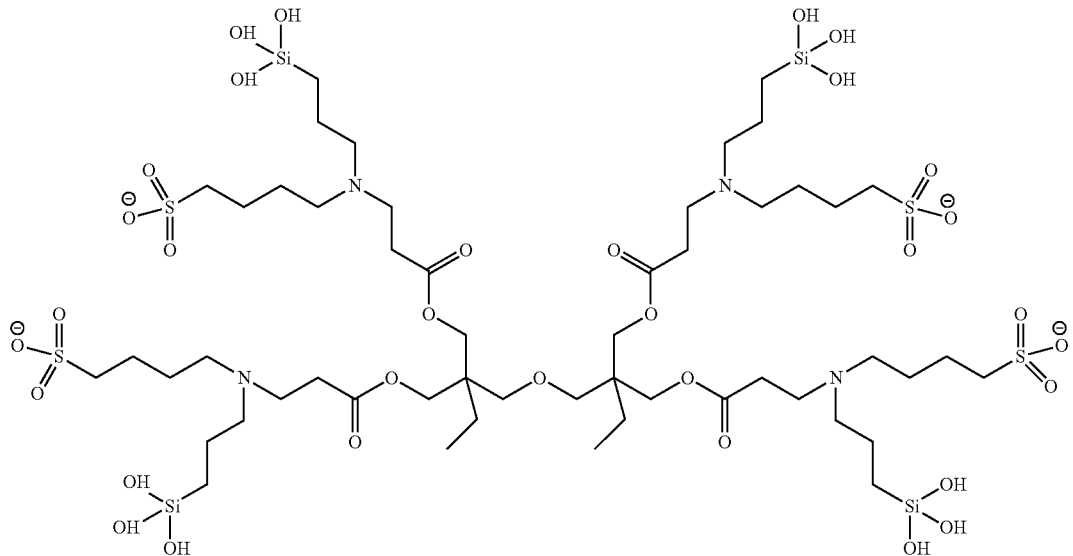
13
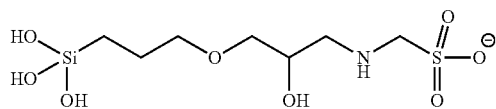
14
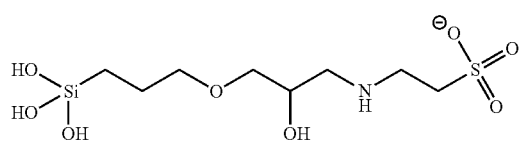
15

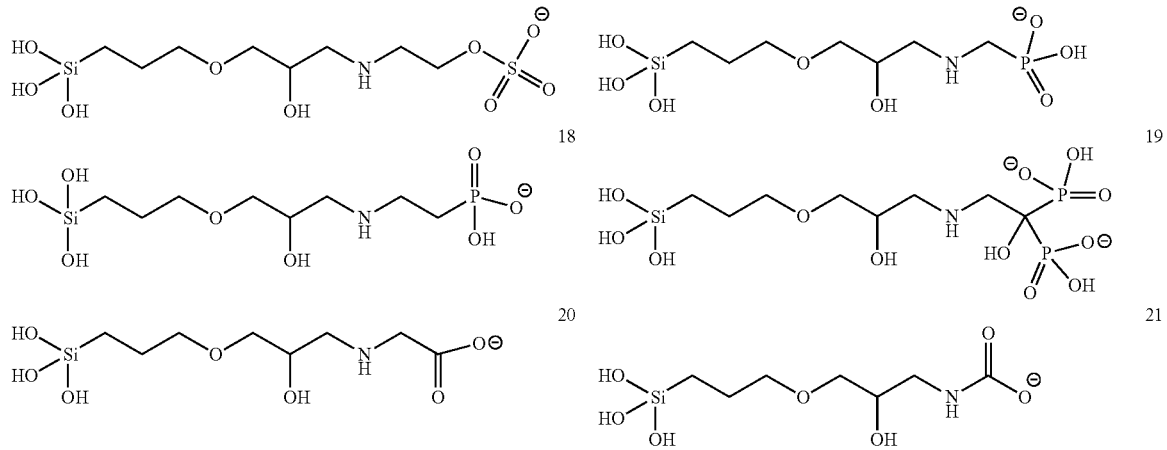

The one or more Y moieties [$(R^1O)_iR_jSi$] of the silanol compound are characterized as silanol moieties. There are p silanol moieties Y in a silanol compound, wherein p is at least 1 and is up to 1000. In some embodiments, each silanol compound includes at least one $R^1$ that is hydrogen. In some embodiments, each of p moieties Y include at least one $R^1$ that is hydrogen. In some embodiments, all or substantially all $R^1$ are hydrogen. In some embodiments, one or more $R^1$ are methyl or ethyl. In some embodiments, one or more Y moieties are selected such that j is 1 or 2. In some such embodiments, one or more $R^2$ is methyl. In some embodiments, i is 3, and j is 0; in other embodiments, i is 2, and j is 1. In some embodiments, p is an integer between 1 and 1000, such as between 1 and 500, or between 1 and 200, or between 1 and 100, or between 1 and 90, or between 1 and 80, or between 1 and 70, or between 1 and 60, or between 1 and 50, or between 1 and 40, or between 1 and 30, or between 1 and 20, or between 1 and 10, or between 1 and 9, or between 1 and 8, or between 1 and 7, or between 1 and 6, or between 1 and 5, or between 2 and 100, or between 3 and 100, or between 5 and 100, or between 10 and 100, or between 10 and 1000; or p is 1, 2, 3, 4, 5, 6, 7, 8, 9, 10, 11, 12, 13, 14, 15, 16, 17, 18, 19, 20, or more up to 1000.

The one or more Z moieties are characterized as amino acidic moieties, meaning that each Z moiety contains an amine moiety and an acidic moiety. The acidic moiety need not be a carboxylic acid; on the other hand, the identity of the acidic moiety depends on the identity of the b number of G moieties. In some embodiments, b is 1 and a is 2. In other embodiments, b is 3 and a is 0. In some embodiments, p is 1. In some embodiments, q is 1. In some embodiments, both p and q are 1.

In some embodiments of q moieties Z, one or more $R^4$ is an electron pair that is uncoordinated. In some embodiments, all $R^4$ are uncoordinated electron pairs. In some embodiments, one or more $R^4$ is an electron pair that is coordinated to a hydrogen atom. In some embodiments, all $R^4$ are electron pairs that are each coordinated to a hydrogen atom.

In some embodiments of q moieties Z, one or more m is an integer between 2 and 10. In some embodiments, all m are integers between 2 and 10, wherein each m is individually selected. In some embodiments, one or more m is 2, 3, 4, 5, 6, 7, 8, 9, or 10. In some embodiments, one or more m is 2. In some embodiments, all m are 2. In some embodiments, one or more m is 3. In some embodiments, all m are 3.

The silanol compound are characterized as acid functional amino moieties. As such, there are q acid functional amino moieties Z in each silanol compound, wherein q is at least 1 and is up to 1000. In each of q moieties Z, $R^3$ is independently selected to be hydrogen or an alkyl, aryl, or alkaryl group having 1 to 18 carbons. In some embodiments, one or more $R^3$ is hydrogen. In some embodiments, all $R^3$ are hydrogen. In some embodiments, one or more $R^3$ is a hydrocarbyl group having 1 to 8 carbons. In some embodiments, all $R^3$ are hydrocarbyl groups having 1 to 8 carbons. In some embodiments, one or more $R^3$ is an alkyl, aryl, or alkaryl group having 1 to 8 carbons. In some embodiments, all $R^3$ are alkyl, aryl, or alkaryl groups having 1 to 8 carbons. In some embodiments, one or more $R^3$ further includes one or more heteroatoms selected from N, O, P, and S; in some embodiments the heteroatoms are N, O, or both N and O. In some embodiments, all $R^3$ further include one or more heteroatoms selected from N, O, P, and S; in some embodiments the heteroatoms are N, O, or both N and O. In some embodiments, one or more $R^3$ is selected to be hydrogen, methyl, ethyl, n-propyl, i-propyl, n-butyl, i-butyl, t-butyl, phenyl, or an alkylated phenyl such as tolyl or benzyl.

Most often in the context of this disclosure, and in particular cases, the silanol compounds do not contain a quaternary amine. In such cases, at least one $R^4$ is an uncoordinated electron pair. This is applicable to all embodiments disclosed herein; use of a quaternary amine would result in a zwitterionic compound, and compounds that are not zwitterionic may have certain properties that are more desirable than zwitterionic compounds.

In some embodiments of q moieties Z, at least one of the b $G^2$ moieties a conjugate base of one of a sulfonic acid moiety, and ester sulfonic acid moiety, a phosphonic acid moiety, or a carboxylic acid moiety. In one or more q moieties Z, the unpaired electrons of the conjugate base are coordinated to a hydrogen atom. In one or more q moieties Z, the conjugate base is a salt comprising a counterion. Thus, in such embodiments, the silanol compound further comprises a counterion. In some embodiments the counterion is a cation. In some such embodiments the counterion is a monovalent cation such as $Na^+$, $Li^+$, or $NH_4^+$. In other embodiments the counterion is a multivalent cation such as Mg$^{2+}$, Ca$^{2+}$, Al$^{3+}$, or Zn$^{2+}$. In some embodiments related to multivalent cations, the silanol compound may be represented as [Y$_p$—X—Z$_q$]$_c$I$^{c+}$, wherein I is the counterion and c is the valency of the counterion.

In some embodiments of q moieties of Z, at least one of the a G$^1$ moieties is a hydroxyl moiety. Most particularly, and most commonly, this occurs when each of the b G$^2$ moieties is a PO$_3$ moiety, or a protonated or salt form thereof.

In some embodiments of q moieties Z, q is an integer between 1 and 1000, such as between 1 and 500, or between 1 and 200, or between 1 and 100, or between 1 and 90, or between 1 and 80, or between 1 and 70, or between 1 and 60, or between 1 and 50, or between 1 and 40, or between 1 and 30, or between 1 and 20, or between 1 and 10, or between 1 and 9, or between 1 and 8, or between 1 and 7, or between 1 and 6, or between 1 and 5, or between 2 and 100, or between 3 and 100, or between 5 and 100, or between 10 and 100, or between 10 and 1000; or q is 1, 2, 3, 4, 5, 6, 7, 8, 9, 10, or any integer up to 1000.

In some embodiments of the silanol compound, both p and q are between 1 and 1000, such as between 1 and 500, or between 1 and 200, or between 1 and 100, or between 1 and 90, or between 1 and 80, or between 1 and 70, or between 1 and 60, or between 1 and 50, or between 1 and 40, or between 1 and 30, or between 1 and 20, or between 1 and 10, or between 1 and 9, or between 1 and 8, or between 1 and 7, or between 1 and 6, or between 1 and 5, or between 2 and 100, or between 3 and 100, or between 5 and 100, or between 10 and 100, or between 10 and 1000. In some embodiments p=q=1, 2, 3, 4, 5, 6, 7, 8, 9, or 10, or more, up to p=1000. In some embodiments, p=q=1.

In some embodiments of the silanol compound, the ratio of p:q is between 2:1 and 1:10. Stated differently, the silanol compound must include at least as many aminosulfonate groups as silanol groups. In some embodiments the silanol compound includes more aminosulfonate groups than silanol groups. In some embodiments, the ratio of p:q is 2:1, or 1:1, or 1:2, or 1:3, or 1:4, or 1:5, or 1:6, or 1:7, or 1:8, or 1:9, or 1:10. In some embodiments, the ratio of p:q is between 2:1 and 1:1, such as 4:3 or 3:2; or is between 1:1 and 1:2, such as 2:3 or 3:4.

The silanol compound Y$_p$—X—Z$_q$ includes at least one covalent bond between X and one Y; and at least one covalent bond between X and one Z. In some embodiments, more than one Y is bonded covalently to X; in some embodiments, all Y are bonded covalently to X. In some embodiments, more than one more than one Z is bonded covalently to X; in some embodiments, all Z are bonded covalently to X. In some embodiments, more than one Y and more than one Z are bonded covalently to X; in some embodiments, all Y and all Z are bonded covalently to X.

Linking group X is selected from saturated or unsaturated, straight chain, branched, or cyclic organic groups. In some embodiments, linking group X is a hydrocarbyl group having 1 to 20 carbons. In some embodiments, linking group X includes one or more heteroatoms. In some embodiments the heteroatoms are selected from O, N, P, and S, and combinations of these. In some embodiments, X includes one or more heteroatoms selected from oxygen and nitrogen. In some embodiments, linking group X includes one or more carbonyl groups, urethane groups, urea groups. Suitable linking groups X include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups. In some embodiments, X includes one or more oxygen atoms, that interrupt the hydrocarbyl group to form an ether group, one or more oxygen atoms that are present as hydroxy groups, or both. In particular embodiments, X has the structure —R$^5$—O—CH(G$^3$)$_k$- wherein R$^5$ is a hydrocarbyl group that is also covalently bound to the Si atom of Y, G$^3$ is H, alkyl, or hydroxyl, k is 0 or 1, and the carbon atom of the CH(G$^3$)$_k$- moiety is also bound to the nitrogen atom of Z. In such cases, at least one of R$^3$ and R$^4$ are H, and typically one of R$^3$ and R$^4$ are H and the other of R$^3$ and R$^4$ is an electron pair.

Any one or more of the foregoing silanol compounds are suitably formed and stored in aqueous solutions as described below. Advantageously, synthesis of the any one or more of the silanol compounds described herein is suitably carried out in aqueous solution, and the resulting aqueous silanol solution is both stable and sufficiently concentrated for economical storage purposes without further need to concentrate or purify the reaction product. Further, aqueous methodologies are usefully employed to dilute, coat, and dry/cure any one or more of the silanol compounds. And finally, any one or more of the silanol compounds described herein are usefully coated onto a surface and dried/cured thereon to result in a silanol treated surface characterized by excellent cleanability and durability.

Synthesis of the any one or more of the silanol compounds described herein is suitably carried out in aqueous solution. However, the synthetic methodology useful to form the silanol compounds is not particularly limited. Any of the silanol compounds described herein may be advantageously synthesized using methodology described herein, but other synthetic methods may also be employed depending on selection and resources available for synthesis, as will be recognized by one of skill upon reading the present disclosures.

In one type of synthetic embodiment, a method of making the silanol compounds comprises or consists essentially of combining a water source and an aminosilane coupling agent to form an aminosilane solution. The aminosilane coupling agent can then be contacted with a heterocyclic compound in order to open the heterocyclic ring and form the silanol compound. The silanol compound is present as an aqueous solution thereof at the end of such syntheses.

In such embodiments, the aminosilane coupling agent includes at least one primary or secondary amino moiety and at least one silane moiety. While it may be possible in principle to use a tertiary amino moiety, tertiary amino moieties are typically not used in the context of this disclosure, because use of a tertiary amino moiety would result in a zwitterionic product having a quaternary ammonium moiety; as discussed above, zwitterionic products are not preferred embodiments in this disclosure. In some embodiments the one or more silane moieties comprise, consist essentially of, or consist of a trialkoxysilane, such as a trimethoxysilane, triethoxysilane, or a mixture thereof; in other embodiments the silane comprises, consists essentially of, or consists of a silanol moiety such as silanetriol; in still other embodiments, the silane comprises, consists essentially of, or consists of a mixture of alkoxy and hydroxy moieties bonded to the one or more silicon atoms of the one or more silane moieties. Nonlimiting examples of useful aminosilanes include 3-aminopropyl trimethoxysilane, 3-aminopropyl triethoxysilane, 3-aminopropylsilanetriol, N-methylaminopropyl trimethoxysilane, N-methylaminopropyl triethoxysilane, N-methylaminopropylsilane triol, (3-(N-ethylamino)isobutyl) trimethoxysilane, N-butylaminopropyl trimethoxysilane, N-phenylaminopropyl trimethoxysilane, N-(2-aminoethyl)-3-aminopropyltrimethoxysilane, (3-trimethoxysilylpropyl) diethylenetriamine, N,N'-bis[(3-trimethoxysilyl)]propyl]ethylenediamine, and the like.

Suitable water sources comprise, consist essentially of, or consist of deionized water, distilled water, tap water, well water, or a municipal water source. In some embodiments, the aminosilane is added to the water source to form an aminosilane solution that is about 10 wt % and as much as about 80 wt % aminosilane based on the weight of the solution, for example about 15 wt % to 80 wt %, or about 20 wt % to 80 wt %, or about 25 wt % to 80 wt %, or about 30 wt % to 80 wt %, or about 35 wt % to 80 wt %, or about 40 wt % to 80 wt %, or about 45 wt % to 80 wt %, or about 50 wt % to 80 wt %, or about 10 wt % to 75 wt %, or about 10 wt % to 70 wt %, or about 10 wt % to 65 wt %, or about 10 wt % to 60 wt %, or about 10 wt % to 55 wt %, or about 10 wt % to 50 wt %, or about 10 wt % to 45 wt %, or about 10 wt % to 40 wt %, or about 10 wt % to 35 wt %, or about 10 wt % to 30 wt %, or about 10 wt % to 25 wt %, or about 15 wt % to 50 wt %, or about 20 wt % to 45 wt %, or about 25 wt % to 40 wt % aminosilane based on the weight of the solution.

Addition of aminosilane to the water source can be accomplished gradually or in a single addition. Such addition is suitable for continuous or batch type processes. In some embodiments, the aminosilane is an aminosilanetriol; that is, the aminosilyl compound comprises, consists essentially of, or consists of Si—OH moieties, that is, silanol moieties. In some embodiments, the aminosilane is deliverable from water solution and is supplied this way, completely avoiding all organic solvents and VOCs during each and every synthetic step described in the type of methodology embodied in the present embodiments.

In other embodiments the aminosilane is an alkoxylated aminosilane and the addition of the aminosilane to the water source is followed by allowing a period of time to pass to allow for hydrolysis of one or more alkoxy groups and concomitant formation of one or more silanol groups within the aminosilane solution. The hydrolysis period is suitably about 1 minute to about 60 hours, depending on the conditions employed. The hydrolysis period often results in formation of one or more silanetriol moieties. Heat is optionally added to or removed from the aminosilane solution during the hydrolysis period; for example, the water source may be adjusted to a temperature of about 10° C. to 50° C. prior to, during, or after addition of aminosilane thereto. In some embodiments, heat is added to the aminosilane solution after a portion of the hydrolysis period has passed, for example after about 10% to 90% of the hydrolysis period has passed, depending on the selection of an operator and species of aminosilane employed.

After the hydrolysis period—if any—has passed, the aminosilane solution is contacted with the heterocyclic compound under conditions suitable for reaction of the aminosilate with the heterocyclic compound in order to open the heterocyclic ring and form the silanol compound. Where the aminosilane is an aminosilanetriol, no hydrolysis period is required, and the combining of aminosilane and water may be suitably followed immediately by the addition of the heterocyclic compound.

In some cases, the heterocyclic compound is a sultone. The use of sultones is particularly advantageous for making compounds of the type exemplified and illustrated by compounds 1-15, or other compounds wherein $G^1$ is H, $G^2$ is $SO_3$, a is 2 and b is 1. The ring opening reaction of sultones by primary and secondary amines is well understood. The molar ratio of aminosilane to sultone contacted is determined by the number of primary and secondary amino moieties of the aminosilane, wherein about 1 molar equivalent of sultone is contacted with about 1 mole of primary or secondary amino moieties. In some embodiments, an amount of sultone slightly greater than 1 molar equivalent is employed, for example 1.1 moles of sultone per mole of primary or secondary amino moieties. In other embodiments, an amount of sultone slightly less than 1 molar equivalent is employed, for example 0.9 moles of sultone mole of primary or secondary amino moieties.

Nonlimiting examples of suitable sultones include 1,3-propanesultone, 1,4-butanesultone, 1,5-pentanesultone, and 1,6-hexanesultone as well as any one or more of these further functionalized with a C1-C4 hydrocarbyl group. Addition of sultone to the aminosilane reaction mixture is accomplished gradually or in a single addition. Such addition is suitable for continuous or batch type processes.

The phosphorous analog of a sultone can in principle be used in substantially the same way as a sultone to form compounds wherein $G^1$ is H, $G^2$ is $PO_3H$, a is 2 and b is 1.

Contacting the sultone with the aminosilane solution to form the aminosilane reaction mixture is optionally followed by allowing a first reaction period of about 1 minute to about 60 hours to pass, during which time the aminosilane reaction mixture is allowed to stand or is agitated or mixed. Heat is optionally further added to or removed from the aminosilane reaction mixture; for example, the aminosilane solution temperature may be adjusted to about 30° C. to 80° C. prior to, during, or after addition of sultone thereto. In some embodiments, heat is added to the aminosilane reaction mixture after a portion of the first reaction period has passed, for example after about 10% to 90% of the first reaction period has passed, depending on the selection of an operator and species of aminosilane and sultone employed.

After the reaction period has passed, a base such as lithium hydroxide (delivered as the monohydrate LiOH·$H_2O$), sodium hydroxide, calcium hydroxide, magnesium hydroxide, or mixture of two or more thereof is added to the aminosilane reaction mixture to form a silanol reaction mixture. The base is added neat or in an aqueous silanol compound reaction mixture; and the addition is gradual or in a single aliquot. Such addition is suitable for continuous or batch type processes. In some embodiments, the base is an hydroxide or an oxide. In some embodiments the base is a mixture of two or more compounds. In some such embodiments, the base comprises a mixture of cations. In some such embodiments, the base comprises a mixture of one or more monovalent cations and one or more multivalent cations. Suitable bases include, but are not limited to LiOH, NaOH, Ca(OH)$_2$, Mg(OH)$_2$, and Al(OH)$_3$. The base is typically added to the aminosilane reaction mixture as an aqueous solution thereof, but it is not necessary to do so depending on the selection of the operator.

Adding the base to the aminosilane reaction mixture to form the silanol reaction mixture is optionally followed by allowing a second reaction period to pass, wherein the second reaction period is about 1 minute to about 60 hours. Heat is optionally further added to or removed from the silanol reaction mixture; for example, the silanol reaction mixture temperature may be adjusted to about 30° C. to 80° C. prior to, during, or after addition of base to the aminosilane reaction mixture. In some embodiments, heat is added to the silanol reaction mixture after a portion of the second reaction period has passed, for example after about 10% to 90% of the second reaction period has passed, depending on the selection of an operator and species of aminosilane, sultone, and base employed.

After the second reaction period, if any, has passed, the resulting aqueous solution comprises, consists essentially of, or consists of water and about 10 wt % to 80 wt % of one or more silanol compounds. The aqueous silanol compound solution may be used as-is to coat one or more substrates as will be described below.

In another type of embodiment, a silane compound is reacted with a compound having at least one primary or secondary amino moiety to form an aminosilane, which is then reacted with a sultone in similar fashion to the above described methods to result in a silanol compound solution. In some such embodiments, Michael addition or other 3,4-type addition reactions of an amino compound with a silane compound bearing an unsaturated moiety are methods that may be used to form one or more aminosilanes. For example, 3-(trimethoxysilyl)propyl acrylate is suitably reacted with 3-aminopropyl trimethoxysilane, followed by addition of sultone to yield a silanol compound in aqueous solution. This type of embodiment provides excellent synthetic architectural flexibility to build multiple silane moieties Y and/or multiple aminosulfonate moieties Z into a single silanol compound, such as up to 1000 Y and/or 1000 Z moieties on a single molecule $Y_p$—X—$Z_q$.

Where in the above described methods the aminosilane is an aminosilanol, it will be noted that no organic solvents are necessary to use, and no organic solvents are generated in the synthetic processes described. The final silanol solution is free of organic solvent. In all such types of syntheses, a concentrated solution of the silanol is easily achieved. By virtue of completing the foregoing synthetic methodology, a silanol solution having more than 20 wt % of the silanol compound dissolved therein and as much as 80 wt % of the silanol compound dissolved therein, is achieved. The silanol solution is of suitable concentration for economical storage and transportation/distribution.

In yet another synthetic embodiment, an acidic compound bearing an amino group can be used as a starting material. In this embodiment, the acidic group can be $CO_2$, $OSO_3$, $PO_3H$, or $C(PO_3H)_2OH$, or $SO_3$, or a protonated or salt form thereof. In principle, there can be any number of acidic groups, which can be the same or different. For example, the acidic compound bearing an amine group can have 1-20 acidic groups, 1-10 acidic groups, 1-5 acidic groups, such as 1 acidic group, 2 acidic groups, 3 acidic groups, 4 acidic groups, or even 5 acidic groups. The acidic compound bearing an amino group can in principle have any number of amino groups, most commonly 1 to 50 amino groups, such as 1-20 amino groups, 1-10 amino groups, or 1-5 amino groups, such as 1 amino group 2, amino groups 3, amino groups 4, amino groups or even 5 amino groups. Most particularly, there is one amino group. Most commonly, the amino group is a primary amino group, although secondary amino groups can also be used. Thus, in particular embodiments, the amine group of the acidic compound bearing an amino group is a primary amine or a secondary amine. In most particular embodiments, the amine group of the acidic compound bearing an amino group is a primary amine. Tertiary amino groups are typically not used on as the amino group on the acidic compound bearing an amine group because use of a tertiary amine would produce a product with a quaternary ammonium moiety which, as discussed above, is not usually employed within the context of this disclosure. Particular acidic compounds bearing amino groups that can be used include In this synthetic embodiment, the amino group can be linked to the acidic group by way of a linking group. Typical linking groups are hydrocarbon groups, which can be cyclic, linear, or branched, and can be optionally interrupted by one or more oxygen or sulfer atoms, or by a urethane, ester, amide, carbonyl groups, urethane groups, urea groups. Most commonly, the group is a hydrocarbon group having 1 to 20 carbon atoms, and more particularly 1-10 carbon atoms. Most commonly, the hydrocarbon group does not contain any ethylenically unsaturated bonds.

In this synthetic embodiment, the acidic compound bearing an amino group can be condensed with a silanol epoxide. Ring opening of epoxides with primary and secondary amines is understood in the art. The molar ratio of acidic compound bearing an amino group to the silanol epoxide is determined by the number of primary and secondary amino moieties of the acidic compound bearing the amino group, wherein about 1 molar equivalent of silanol epoxide is contacted with about 1 mole of primary or secondary amino moieties. In some embodiments, an amount of silanol epoxide slightly greater than 1 molar equivalent is employed, for example 1.1 moles of silanol epoxide per mole of primary or secondary amino moieties. In other embodiments, an amount of silanol epoxide slightly less than 1 molar equivalent is employed, for example 0.9 moles of silanol epoxide mole of primary or secondary amino moieties.

In principle any silanol epoxide can be employed so long as it does not contain any functional groups that would interfere with the ring opening of the epoxide moiety of the silane epoxide by the primary or secondary amine of the acidic compound containing an amino functional group. Some epoxides can have a directing group, such as an alkyl group or an ether group, in the alpha or beta position with respect to the epoxide. Such groups can ensure regioselective addition of the amine to the epoxide. Exemplary silanol epoxide that can be used include for example, (3-Glycidoxypropyl) Trimethoxysilane, and 2-(3,4-Epoxycyclohexyl) ethyl trimethoxysilane available from Gelest, Inc., Morrisville, PA.

In embodiments, the silanol solutions comprise or consist essentially of a silanol compound and water. Silanol solutions consisting essentially of a silanol compound and water are found to have a pH between 9 and 12, or between 9 and 11.5, or 9 and 11, or 9 and 10.5 depending on the specific silanol compound(s) in the solution. The pH may be modified by an operator if desired, but is it not necessary to modify pH in order to provide a stable silanol solution. Thus, for example, we have observed that the self-condensation of silane species, commonly observed in both alkoxysilane and silanol-functional compounds, does not lead to apparent silanol solution instability. Further, the resulting silanol treated surfaces provide consistently excellent cleanability and durability regardless of the storage period prior to coating and curing.

Further, the silanol compound solutions are stable in concentrated form: that is, the silanol compound solutions may be stored in an enclosed container sufficient to prevent substantial evaporation of water, for a storage period of about 1 week to about 10 years, or about 1 month to 10 years, or about 1 year to 10 years, or about 1 year to 5 years, or about 1 year to 3 years, or about 1 year to 2 years when stored at temperatures between about 10° C. and about 60° C. throughout the storage period. By "stable", it is meant that the silanol compounds stored in the solutions provide, within experimental error, the same solution properties, the same coated/cured properties, or both before and after the storage period.

The silanol solutions are usefully employed to dilute, coat, and dry/cure any one or more of the silanol compounds disclosed herein on a surface. Synthetic methods such as those described above, and similar types of reaction methodologies lead to formation of silanol compounds in water, typically in concentrated solutions. These concentrated silanol solutions can be suitably diluted with water to concentration of about 1 ppm by weight to about 100,000 ppm by weight (10 wt %) to form a silanol coating composition, such as about 10 ppm to 10 wt %, or about 100 ppm to 10 wt %, or about 1000 ppm to 10 wt %, or about 0.1 wt % to 10 wt %, or about 1 wt % to 10 wt %, or about 2 wt % to 10 wt %, or about 5 wt % to 10 wt %, or about 1 wt % to 5 wt %, or about 2 wt % to 7 wt % to form the silanol coating composition. Any of the foregoing silanol compounds can be suitably diluted simply by adding a water source to a concentrated silanol solution to form a silanol coating composition.

Thus, the silanol coating compositions comprise, consist essentially of, or consist of one or more silanol compounds and water. In some embodiments, one or more adjuvants are suitably added to one or more silanol coating compositions. Adjuvants are one or more compounds added to the silanol coating composition to improve speed of silanol cure or improve the properties of the cured silanol compounds after coating and drying/curing on a surface such as cleanability, durability, or both. Adjuvants are suitably added to a concentrated silanol solution, followed by dilution to form a silanol coating composition; or are added directly to a silanol coating composition prior to coating in amounts ranging from 10:1 to 1:10 molar ratio of silanol compound to adjuvant, for example 10:1 to 1:5, or 10:1 to 1:2, or 10:1 to 1:1, or 10:1 to 2:1, or 10:1 to 5:1, or 5:1 to 1:10, or 2:1 to 1:10, or 1:1 to 1:10, or 1:5 to 1:10, or 5:1 to 1:5, or 3:1 to 1:3, or 2:1 to 1:2. One exemplary useful adjuvant is a silicate, such as lithium silicate, sodium silicate, or lithium sodium silicate.

Any one or more of the silanol compounds described herein are usefully coated onto a surface and dried/cured thereon to result in a silanol treated surface characterized by excellent cleanability and durability. A surface is suitably coated with any one or more of the silanol coating compositions described above wherein the coating thickness applied prior to drying is about 1 micron to 500 microns thick on the surface. Coatings are suitably applied to any solid surface using conventional methods for coating thin aqueous layers. Such methods include gravure coating, die coating, wire-wrapped bar coating, notch bar coating, slot coating, spray coating, dip coating, flexographic printing, inkjet printing, screen printing, or any other such method. An article comprising a silanol treated surface, the article comprising a substrate having a reactive surface; and a residue of a silanol compound reacted on the reactive surface Since many of the silanol coating compositions are free of volatile organic compounds (VOCs), one of skill is presented with obviation of the need to ventilate or capture organic solvents during removal of solvent (drying). Coating a surface with a silanol coating composition, followed by removal of a portion of the water from the silanol coating composition and curing of the silanol composition on the surface, results in a silanol treated surface.

Suitable surfaces for coating the silanol coating compositions thereon to form a silanol treated surface include any solid substrate with a surface available for coating. Solid substrates include wood, glasses, plastics, and metals and substrates that are a combination of two or more of these. Suitable substrates include natural nonwovens such as paper or cardboard, polymeric films such as polyester (e.g., polyethylene terephthalate, polybutylene terephthalate), polyolefin (e.g., polypropylene, polyethylene, and copolymers of these), polyvinyl chloride, polycarbonates, allyldiglycol carbonates, polyacrylate esters such as polymethylmethacrylate, polystyrene, polysulfone, polyethersulfone, epoxy polymers including copolymers thereof with polydiamines or polydithiols, cellulose esters such as acetate and butyrate, polylactic acid, and blends thereof. Other suitable solid substrates include fibers, sheets, foils, and woven or nonwoven fabrics formed from one or more fibers. The type, shape, and dimensions of the solid substrate are not particularly limited, and any solid substrate having a coatable surface may be suitably employed as the substrate, wherein a surface or a portion thereof is coated with one or more silanol coating compositions to form a silanol treated surface.

At least a portion of the silanol treated surface is capable of forming Si—O—Si bonds (siloxane bonds) with one or more silanol compounds, such as those described herein; or alternatively with one or more conventional silane coupling agents such as a trialkoxysilane. This reactive capability may be an inherent characteristic of the substrate, or it may be imparted to a substrate surface by a treatment (such as corona treatment, plasma or flame etching, or the like) or by adding one or more reactive layers. Surfaces having inherently reactive capability include glass and ceramic surfaces. One example of a reactive layer that may be added to a surface that does not inherently possess reactive capability is described in U.S. Pat. No. 6,696,157 (David et al.) which discloses "diamond-like glass" (DLG) layers suitable for application to one or more substrates to result in a hardcoat that is also reactive toward the silanol compounds described herein. Illustrative diamond-like glass materials suitable for use herein comprise a carbon-rich diamond-like amorphous covalent system containing carbon, silicon, hydrogen and oxygen. The DLG is created by depositing a dense random covalently bonded system comprising carbon, silicon, hydrogen, and oxygen by ion bombardment using a powered electrode in a radio frequency ("RF") chemical reactor. Such surfaces are suitably formed on any one or more of the foregoing substrates to result in a surface having reactive capability.

After coating one or more silanol coating compositions onto a surface having reactive capability, the silanol treated surface is cured by evaporating water from the coating, adding heat to the coated surface, or both. Drying and curing may be contemporaneous, depending on conditions employed. Drying and curing is accomplished using conventional methods for curing silane compounds or silanol compounds generally: such methods include applying ventilation, heating the substrate or a portion thereof to a temperature between about 50° C. and 200° C., for example about 100° C. to 200° C., or about 120° C. to 180° C., or about 130° C. to 150° C., for a curing period of about 1 second to about 5 hours, such as about 1 minute to 1 hour, or 1 minute to 30 minutes, or 1 minute to 10 minutes, or another period of time, depending on thickness of the coating, air flow facilitating evaporation of water, and temperature employed.

The silanol treated surfaces are suitably formed employing any one or more of the silanol coating compositions described herein by coating on a surface of a substrate having reactive capability, followed by drying and curing. The silanol treated surfaces include a layer of the coated silanol compound that when dried and condensed (cured) is about 10 nm to 10 microns thick, such as 10 nm to 5 microns, or 10 nm to 3 microns, or 10 nm to 2 microns, or 10 nm to 1 micron, or 10 nm to 500 nm, or 10 nm to 300 nm, or 10 nm to 200 nm, or 50 nm to 500 nm, or 50 nm to 250 nm, or 100 nm to 300 nm thick. In some embodiments, the silanol treated surface includes a layer of the coated silanol compound that when dried and condensed (cured) is greater than about 10 nm, or 20 nm, or 30 nm, or 40 nm, or 50 nm, or 60 nm, or 70 nm, or 80 nm, or 90 nm, or 100 nm thick. In some embodiments, the silanol treated surface includes a layer of the coated silanol compound that when dried and condensed (cured) is less than about 10 microns, or 5 microns, or 3 microns, or 2 microns, or 1 micron, or 500 nm, or 300 nm, or 250 nm, or 200 nm thick.

The silanol treated surfaces are characterized by excellent cleanability and durability. For example, permanent markers used to mark a silanol treated surface as described herein may be cleaned from a silanol treated surface by dry erase type action (rubbing the marked surface with a dry cloth or paper towel article) or by wet erase action (rubbing the marked surface with a dampened cloth or paper towel article) wherein the result of such cleaning after aging the marked surface at 50° C. for about 16 hours is a completely mark-free, ghost-free surface. These results are commensurate with results obtained from treated surfaces wherein the treatment is a zwitterionic trialkoxysilane coated from a methanol solution and dried/cured, as disclosed and exemplified in U.S. Pat. No. 9,527,336. Water aging of marked samples, known to exacerbate the adhesion of permanent marker ink on dry erase surfaces, reveals that the silanol compounds described herein are superior to the zwitterionic trialkoxysilanes exemplified in U.S. Pat. No. 9,527,336 in cleanability after aging. Thus, the silanol treated surfaces described herein are at least as cleanable, and in some embodiments exhibit superior cleanability to surfaces treated with the zwitterionic trialkoxysilanes of U.S. Pat. No. 9,527,336, while possessing the advantage of being synthesized in water, and stored in water, coated from aqueous solution, or two or more of these.

Further, even after soaking a silanol treated surface in water for 24 hours, followed by abrading the soaked surface, abrasion of the wet aged silanol treated surface reveals excellent mechanical durability and scratch-resistance performance. The mechanical durability and scratch-resistance of the silanol treated surfaces is similar to or the same as the performance of surfaces treated with the zwitterionic trialkoxysilanes of U.S. Pat. No. 9,527,336.

Experimental Section

All materials employed in this section are commercially available, for example, from Sigma-Aldrich Chemical Company; Milwaukee, WI, or known to those skilled in the art unless otherwise stated or apparent. Specific materials used in the Examples are shown in Table 1.

TABLE 1

Materials and sources as used in the Examples

| Material Name/Designation | Description |
|---|---|
| 3-Aminopropyl trimethoxysilane | Product Code: SIA0611.1; obtained from Gelest, Inc; Morrisville, PA. |
| 3-Aminopropyl triethoxysilane | Product code: SIA0610.1; obtained from Gelest, Inc; Morrisville, PA. |
| 3-Aminopropylsilanetriol, 22-25% in water | Product Code: SIA0608.0; obtained from Gelest, Inc; Morrisville, PA. |
| 3-Aminopropyl methyldiethoxysilane | Product Code: SIA0605.0; obtained from Gelest, Inc; Morrisville, PA. |
| N-Methylaminopropyl trimethoxysilane | Product Code: SIM6500.0; obtained from Gelest, Inc; Morrisville, PA. |
| (3-(N-Ethylamino)isobutyl) trimethoxysilane | Product Code: SIE4886.0; obtained from Gelest, Inc; Morrisville, PA. |
| N-(2-Aminoethyl)-3-aminopropyl trimethoxysilane | Product Code: SIA0591.0; obtained from Gelest, Inc; Morrisville, PA. |
| N-(2-Aminoethyl)-3-aminopropylsilanetriol, 25% in water | Product Code: SIA0590.0; obtained from Gelest, Inc; Morrisville, PA. |
| (3-Trimethoxysilylpropyl) diethylenetriamine | Product Code: SIT8398.0; obtained from Gelest, Inc; Morrisville, PA. |
| Bis(3-Trimethoxysilylpropyl) Amine | Product Code: SIB1833.0; obtained from Gelest, Inc; Morrisville, PA. |
| N,N'-Bis[(3-trimethoxysilyl)] propyl]ethylenediamine, 60% in methanol | Product Code: SIB1834.0; obtained from Gelest, Inc; Morrisville, PA. |
| 3-(Trimethoxysilyl)propyl acrylate | Product Code: SIA0200.0; obtained from Gelest, Inc; Morrisville, PA. |
| Trimethylolpropane triacrylate, reagent grade | Multifunctional acrylate, obtained from Sigma-Aldrich Chemical Company; Milwaukee, WI |
| Di(trimethylolpropane) tetraacrylate | Multifunctional acrylate, obtained from Sigma-Aldrich Chemical Company; Milwaukee, WI |
| 1,3-Propane sultone | Obtained from Sigma-Aldrich Chemical Company; Milwaukee, WI |
| 1,4-Butane sultone | Obtained from Sigma-Aldrich Chemical Company; Milwaukee, WI |
| Lithium hydroxide monohydrate, LiOH•H2O | Obtained from Sigma-Aldrich Chemical Company; Milwaukee, WI |
| Isopropyl Alcohol | Obtained from VWR Corporate, Radnor, PA |
| Methanol | Obtained from VWR Corporate, Radnor, PA |
| Trimethylolpropane triacrylate | Trade name: SR351LV; Obtained from Sartomer Company, Exton, PA. |

TABLE 1-continued

Materials and sources as used in the Examples

| Material Name/Designation | Description |
|---|---|
| 3-(Trimethoxysilyl)propyl methacrylate | Trade name: A-174; Obtained from Momentive Performance Materials Inc., Waterford, NY |
| (3-Glycidoxypropyl) Trimethoxysilane | obtained from Gelest, Inc; Morrisville, PA. |
| Aminomethanesulfonic acid | $NH_2CH_2SO_2(OH)$; obtained from Sigma-Aldrich Chemical Company; Milwaukee, WI. |
| Taurine; 2-Aminoethanesulfonic acid | $NH_2CH_2CH_2SO_2(OH)$; obtained from Alfa Aesar Chemical, Ward Hill, MA. |
| 2-Aminoethyl hydrogen sulfate | $NH_2CH_2CH_2OSO_2(OH)$; obtained from MP Biomedicals, Irvine, CA. |
| Alendronic acid | $C_4H_{13}NO_7P_2$; obtained from TCI America, Portland, OR. |
| (Aminomethyl)phosphonic acid | $NH_2CH_2P(O)(OH)_2$; obtained from Alfa Aesar Chemical, Ward Hill, MA. |
| (2-Aminoethyl)phosphonic acid | $NH_2CH_2CH_2P(O)(OH)_2$; obtained from Oakwood Chemical, Estill, SC. |
| Glycine | $NH_2CH_2COOH$; obtained from TCI America, Portland, OR. |
| β-Alanine; 3-Aminopropionic acid | $NH_2CH_2CH_2COOH$; obtained from Alfa Aesar Chemical, Ward Hill, MA. |
| Solium hydroxide pallet | NaOH; obtained from Sigma-Aldrich Chemical Company; Milwaukee, WI. |
| Surface modified nanoparticles, Nanosilica | Prepared as described in WO 2011/094342 |
| Esacure One | Photoinitiator; Obtained from Lamberti USA Inc, Hungerford, TX |
| Lithium silicate; LSS-75 | Trade name: LSS-75; Obtained from Nissan Chemical America Corporation, Houston, TX |
| White PET | 7 mil (105 micrometer) thick, primed on both side, white polyester film, obtained from Mitsubishi PET film LLC, Greenville, SC under trade designation "W54B" |
| DLG layer | Diamond-like glass, deposited by plasma-assisted vapor deposition, as described in U.S Pat. No. 5,888,594. (David, et al.) |
| 3M ScotchGuard ® microfiber cloth | Obtained from 3M Company, Maplewood, MN. |
| 3M ScotchBrite ® Blue non-damage pad | Obtained from 3M Company, Maplewood, MN. |
| Kleenex ® facial tissue | Obtained from Kimberly-Clark Corporation, Neenah, WI. |
| WYPALL L40 paper towel | Obtained from Kimberly-Clark Corporation, Neenah, WI. |
| Expo Bold Color Dry Erase | Dry erase marker, obtained from Sanford Corporation, Bellwood, Illinois |
| Sharpie Marker, fine point | Permanent marker, obtained from Sanford Corporation, Bellwood, Illinois |
| Avery Mark-A-lot, chisel point | Permanent marker, obtained from Avery-Dennison Corporation, Glendale, CA |
| BIC markers, fine point | Permanent marker, obtained from Societe BIC S.A, Clichy Cedex, FRANCE |

Test Methods

1. Permanent Marker Erasability

A total of 3 brands of permanent markers, i.e., Sharpie fine tip, Avery Mark-A-lot, BIC fine tip, are used for evaluation. Two colors of marker from each brand are chosen, one black and the other red or blue. All fresh samples were cleaned by water and paper towels before testing. The samples are written on the brand name of each of the six permanent markers with the respective marker. The marker inks of the writings were allowed to age on the surface at 50° C. in a bench-top oven overnight. The sample was then placed on a flat lab bench. DI water was sprayed on the writing with a spray bottle in 2-3 short sprays. A visual test was performed after about 20 seconds to observe if water wets out the surface and covers all the marker inks. The writings were then wiped with a paper towel with moderate hand pressure. A visual test was performed to evaluate the percentage of the marker inks remained on the sample after 10 times of gentle wiping. The erasability performance was scored on a 1-5 scale, wherein, 5 represents premium erasability with all markers completely gone after 10 times of wiping, leaving no ghosting, remaining ink, or permanent staining; 4 represents generally good performance, with <10% remaining ink after 10 times of wiping; 3 represents fairly good performance with <25% ink remaining; 2 represents poor performance, meaning that the marker ink is relatively difficult to remove, with 50% ink remained on the sample after 10 times of wiping; 1 represents even worse performance, meaning that marker ink is extremely difficult to remove, with more than 75% of marker inks remained after 10 times of wiping.

2. Quantitative Measurement of Permanent Marker Removability of Aged Samples

The film samples were aged by soaking in DI water for 24 hrs. Their performance was then evaluated by writing on the surface with permanent markers and removing with water using a Taber Abrader. Samples were given a score ranging from 0 to 30, with zero being the worst performance and 30 being the best performance. Specifically, samples of 2"×6"

strips were placed in a water bath filled with about 1 L of DI water, and were allowed to age in DI water at room temperature for 24 hrs. The samples were then removed from the bath, cleaned with paper towels, and dried for about 10 mins. The samples were then marked with 3 straight lines for each marker type in the following order: Sharpie black, sharpie red, BIC black, BIC blue, Avery black, Avery red. The marked samples were then placed in a bench-top oven and allowed to age at 50° C. for 1 hr. The erasability test was done on a single-arm linear mode Taber Abrader (Model 5750). The samples were wiped by the mechanical stylus of the Taber Abrader equipped with a 2" microfiber cloth as erasing medium for a total of 60 cycles, following a three-step-process: (1) 1 mL water added to the microfiber cloth, 1 kg weight on the stylus, abrading for 20 cycles; (2) 0.5 mL more water added to the microfiber cloth, 1 kg weight on the stylus, abrading for 20 cycles; (3) no more water added, 2 kg weight on the stylus, abrading for 20 cycles. A transparent grid was then used to measure quantitatively the remaining ink after each step. Samples were given a score ranging from 0 to 30, with zero being the best performance and 30 being the worst performance. The percentage of remained ink was also recorded.

3. Tissue Dry Abrasion Test

All samples were prepared in 2"×6" strips, which were cleaned by DI water and paper towels followed by drying for 10 min prior to testing. A sample was laid flat and attached to the stage of a Taber Abraser (Model 5750). A piece of Kleenex® facial tissue in 2" diameter was attached to the mechanical stylus of the Taber Abrader. An auxiliary weight of 2.0 kg was loaded onto the stylus. The whole area of the sample surface was covered with black Expo® dry erase marker ink by writing back and forth at a moderate to slow pace across the surface. The sample was then abraded by the 2" Kleenex® facial tissue under 2.0 kg weight for 400 cycles at a rate of 60 cycles/min. The sample was then removed from the Taber Abraser stage, cleaned with water, and allowed to dry about 3 mins. The sample was then marked with a Sharpie Black permanent marker and allowed to sit for about 3 mins. The sample surface was then sprayed with DI water to remove permanent marker inks by wiping with paper towels using gentle hand pressure. A visual test was performed to observe water wettability and the unremoved stains on the surface. It is a pass if no permanent staining was observed; conversely, it is a failure when obvious permanent staining is observed. The above procedures were repeated, until the sample stains. The total number of cycles sample undergoes before staining is reported.

4. Scratch-Resistance Test

The mechanical durability and scratch-resistance performance were tested using a Taber Abrader (Model 5750). The test apparatus was similar to the instrument described in standard test method ISO 1518-1:2011 "Paints and varnishes—Determination of scratch resistance—Part 1: Constant-loading method". The film samples were cut to 2"×6" rectangular size and taped on the Abrader stage. A piece of ScotchBrite® non-damage blue pad with a 2" diameter was attached to the mechanical stylus of the Abrader. An auxiliary weight of 1.0 kg was loaded on the stylus. Test parameters were set up the same for all samples (stoke length 3", speed 60 cycle/min, 3,500 cycles). The sample was taken out from the stage after abrasion for 3,500 cycles, cleaned with water and paper towels, and marked with a Sharpie Black permanent marker cross the whole sample. The marked sample was then placed in a bench-top oven and allowed to age at 50° C. for 1 hr. The sample surface was then sprayed with DI water to remove the Sharpie permanent marker inks, by wiping with paper towels using gentle hand pressure. A visual test was performed to observe water wettability and the unremoved inks or stains on the surface. It is a pass if no more than 3 obvious permanent stains (e.g., a line of scratch longer than 2") were found; conversely, it is a failure when more than 3 obvious permanent stains were found with reasonable certainty.

Preparation of Compounds

Compound 1: N-Trihydroxysilylpropyl-Amino Propyl Sulfonic Acid Lithium Salt

To a round bottom flask equipped with an additional funnel and a stir bar was added DI water (50 g). 3-Aminopropyl trimethoxysilane (MW=221.4; 22.1 g; 0.100 mol) was slowly added to water through the additional funnel in 30 min. The mixture was allowed to stir at room temperature for about 1 hr. 1,3-Propane sultone (MW=122.1; 12.2 g; 0.100 mol) was added to the above mixture dropwisely through an additional funnel in about 30 minutes. The combined reaction mixture was further stirred at room temperature for 12 hrs. Lithium hydroxide monohydrate (LiOH·H$_2$O; MW=41.96; 4.20 g; 0.100 mol) was added to the flask, and the mixture was further stirred at 50° C. for 4 hrs to yield the final product as an aqueous solution with a solid content of about 35%.

The same compound was made by using a hydrolyzed precursor, 3-aminopropylsilanetriol (25% in water), which is commercially available from Gelest, Inc. To a glass jar equipped with a stir bar was loaded with 3-Aminopropylsilanetriol (MW=137.2; 54.8 g; 0.100 mol). 1,3-Propane sultone (MW=122.1; 12.2 g; 0.100 mol) was slowly added to the jar in about 30 min with stirring. The reaction was allowed to proceed at room temperature for 12 hrs. Lithium hydroxide monohydrate (LiOH·H$_2$O; MW=41.96; 4.20 g; 0.100 mol) was then added to the jar, and the mixture was further stirred at 50° C. for 4 hrs to yield the final product as an aqueous solution with a solid content of about 35%. It is noteworthy that no organic solvent was used or generated in this reaction, resulting in the final product being free of organic solvent.

Compound 2. N-Trihydroxysilylpropyl-Amino Butyl Sulfonic Acid Lithium Salt

To a round bottom flask equipped with an additional funnel and a stir bar was added DI water (50 g). 3-Aminopropyl trimethoxysilane (MW=221.4; 22.1 g; 0.100 mol) was slowly added to water through the additional funnel in 30 min. The mixture was allowed to stir at room temperature for about 1 hr. 1,4-Butane sultone (MW=136.2; 13.6 g; 0.100 mol) was added to the above mixture slowly through an additional funnel in about 30 minutes. The combined reaction mixture was further stirred at 65° C. for 12 hrs. Lithium hydroxide monohydrate (LiOH·H$_2$O; MW=41.96; 4.20 g; 0.100 mol) was added to the flask, and the mixture was further stirred at 50° C. for 4 hrs to yield the final product as an aqueous solution with a solid content of about 35%.

Similar to Compound 1, Compound 2 was alternatively made by using a hydrolyzed precursor, 3-aminopropylsilanetriol (25% in water). To a glass jar equipped with a stir bar was loaded with 3-Aminopropylsilanetriol (MW=137.2; 54.8 g; 0.100 mol). 1,4-Butane sultone (MW=136.2; 13.6 g; 0.100 mol) was slowly added to the jar in about 30 min with stirring. The reaction was allowed to proceed at room temperature for 12 hrs. Lithium hydroxide monohydrate (LiOH·H$_2$O; MW=41.96; 4.20 g; 0.100 mol) was then added to the jar, and the mixture was further stirred at 50° C. for 4 hrs to yield the final product as an aqueous solution with a solid content of about 35%, which is free of organic solvent.

Compound 3:
N-Methyldihydroxysilylpropyl-Amino Propyl Sulfonic Acid Lithium Salt 3-Aminopropyl methyldiethoxysilane (MW=191.3; 1.91 g, 10 mmol) and DI water (8.0 g) were added to a screw-top jar and the mixture was stirred for about 1 hr. 1,3-Propane sultone (MW=122.1; 1.22 g; 10 mmol) was added to the jar, and the combined reaction mixture was stirred at room temperature for 12 hrs. Lithium hydroxide monohydrate (LiOH·H$_2$O; MW=41.96; 0.42 g; 10 mmol) was then added to the jar, and the mixture was further stirred at 50° C. for about 1 hr to yield the final product as an aqueous solution.

Compound 4:
N-Methyldihydroxysilylpropyl-Amino Butyl Sulfonic Acid Lithium Salt 3-Aminopropyl methyldiethoxysilane (MW=191.3; 1.91 g, 10 mmol) and DI water (8.0 g) were added to a screw-top jar and the mixture was stirred for about 1 hr. 1,4-Butane sultone (MW=136.2; 1.36 g; 10 mmol) was added to the jar, and the combined reaction mixture was subsequently warmed up and mixed at 65° C. for about 12 hrs. Lithium hydroxide monohydrate (LiOH·H$_2$O; MW=41.96; 0.42 g; 10 mmol) was then added to the jar, and the mixture was further stirred at 50° C. for about 1 hr to yield the final product as an aqueous solution.

Compound 5.
N-Methyl-N'-Trihydroxysilylpropyl-Amino Propyl Sulfonic Acid Lithium Salt To a round bottom flask equipped with an additional funnel and a stir bar was added DI water (50 g). N-Methylaminopropyl trimethoxysilane (MW=193.32; 19.3 g; 0.100 mol) was slowly added to water through the additional funnel in 30 min. The mixture was allowed to stir at room temperature for about 1 hr. 1,3-Propane sultone (MW=122.1; 12.2 g; 0.100 mol) was added to the above mixture slowly through an additional funnel in about 30 minutes. The combined reaction mixture was further stirred at room temperature for 12 hrs. Lithium hydroxide monohydrate (LiOH·H$_2$O; MW=41.96; 4.20 g; 0.100 mol) was added to the flask, and the mixture was further stirred at 50° C. for 4 hrs to yield the final product as an aqueous solution with a solid content of about 35%.

Compound 6.
N-Methyl-N'-Trihydroxysilylpropyl-Amino Butyl Sulfonic Acid Lithium Salt To a round bottom flask equipped with an additional funnel and a stir bar was added DI water (50 g). N-Methylaminopropyl trimethoxysilane (MW=193.32; 19.3 g; 0.100 mol) was slowly added to water through the additional funnel in 30 min. The mixture was allowed to stir at room temperature for about 1 hr. 1,4-Butane sultone (MW=136.2; 13.6 g; 0.100 mol) was added to the above mixture slowly through an additional funnel in about 30 minutes. The combined reaction mixture was further stirred at room temperature for 12 hrs. Lithium hydroxide monohydrate (LiOH·H$_2$O; MW=41.96; 4.20 g; 0.100 mol) was then added to the flask, and the mixture was further stirred at 50° C. for 4 hrs to yield the final product as an aqueous solution with a solid content of about 35%.

Compound 7.
N-Ethyl-N'-Trihydroxysilylisobutyl-Amino Butyl Sulfonic Acid Lithium Salt (3-(N-Ethylamino)isobutyl) trimethoxysilane (MW=221.4; 2.21 g, 10 mmol) and DI water (8.0 g) were added to a screw-top jar and the mixture was stirred for about 1 hr. 1,4-Butane sultone (MW=136.2; 1.36 g; 10 mmol) was added to the jar, and the combined reaction mixture was subsequently warmed up to 65° C. and mixed for 12 hrs. Lithium hydroxide monohydrate (LiOH·H$_2$O; MW=41.96; 0.42 g; 10 mmol) was then added to the jar, and the mixture was further stirred at 50° C. for about 1 hr to yield the final product as an aqueous solution with a solid content of about 25%.

Compound 8

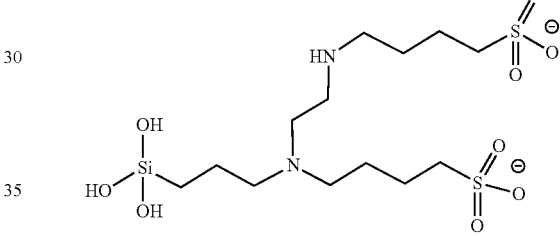

N-(2-Aminoethyl)-3-aminopropyltrimethoxysilane (MW=222.4; 2.22 g, 0.01 mol) and DI water (20 g) were added to a screw-top jar and the mixture was stirred for about 1 hr. 1,4-Butane sultone (MW=136.2; 2.72 g; 0.02 mol) was added to the jar, and the combined reaction mixture was subsequently warmed up to 65° C. and mixed for 12 hrs. Lithium hydroxide monohydrate (LiOH·H$_2$O; MW=41.96; 0.84 g; 0.02 mol) was then added to the jar, and the mixture was further stirred at 65° C. for about 1 hr to yield the final product as a yellowish aqueous solution with a solid content of about 20%.

Alternatively, the compound could be made by using a hydrolyzed precursor, N-(2-aminoethyl)-3-aminopropylsilanetriol (25% in water), which is commercially available from Gelest, Inc. To a glass jar equipped with a stir bar was loaded with N-(2-Aminoethyl)-3-aminopropylsilanetriol (MW=180.3; 20 g; 0.028 mol). 1,4-Butane sultone (MW=136.2; 7.6 g; 0.056 mol) was added to the jar, and the combined reaction mixture was subsequently warmed up to 65° C. and mixed for 12 hrs. Lithium hydroxide monohydrate (LiOH·H$_2$O; MW=41.96; 2.3 g; 0.056 mol) was then added to the jar, and the mixture was further stirred at 50°

C. for about 1 hr to yield the final product as a yellowish aqueous solution. It is noteworthy that no organic solvent was used or generated in this reaction, resulting in the final product free of organic solvent.

Compound 9

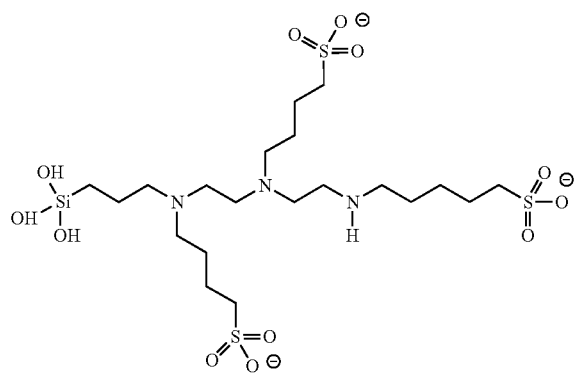 [SMILES: O=S(=O)([O-])CCCCCNCCN(CCCCS(=O)(=O)[O-])CCN(CCCCS(=O)(=O)[O-])CCC[Si](O)(O)O]

(3-Trimethoxysilylpropyl) diethylenetriamine (MW=265.4; 2.65 g, 0.01 mol) and DI water (20 g) were added to a screw-top jar and the mixture was stirred for about 1 hr. 1,4-Butane sultone (MW=136.2; 4.1 g; 0.03 mol) was added to the jar, and the combined reaction mixture was subsequently warmed up to 65° C. and mixed for 12 hrs. Lithium hydroxide monohydrate (LiOH·H$_2$O; MW=41.96; 1.26 g; 0.03 mol) was then added to the jar, and the mixture was further stirred at 50° C. for about 1 hr to yield the final product as a yellowish aqueous solution.

Compound 10

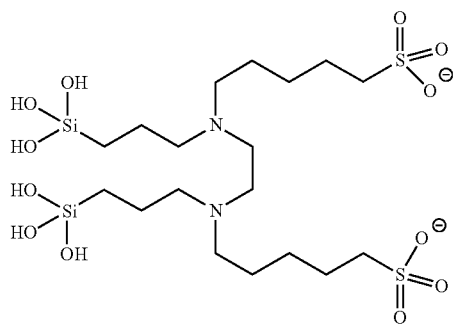 [SMILES: O=S(=O)([O-])CCCCCN(CCC[Si](O)(O)O)CCN(CCCCCS(=O)(=O)[O-])CCC[Si](O)(O)O]

To a round-bottom flask equipped with a stir bar was added N,N'-Bis[(3-trimethoxysilyl)] propyl]ethylenediamine (60% in methanol; MW=384.6; 50 g; 0.078 mol) and MeOH (30 g). 1,4-Butane sultone (MW=136.2; 21.2 g; 0.156 mol) was slowly added to the flask, and the combined reaction mixture was allowed to proceed at 65° C. for 12 hrs. The reaction solution was concentrated by evaporating off most MeOH, and then slowly added to a screw-top jar containing lithium hydroxide monohydrate (LiOH·H$_2$O; MW=41.96; 6.6 g; 0.156 mmol) and DI water (200 g) with vigorous stirring. The jar was subsequently heated up to 50° C. for 4 hrs to allow for hydrolysis of trimethoxysilane groups, resulting in the final product as an aqueous solution.

Compound 11

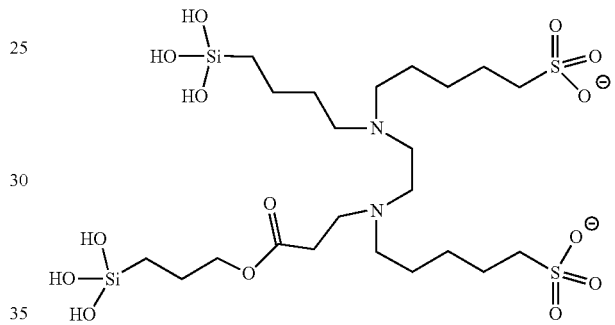

To a screw-top jar was added 3-(trimethoxysilyl)propyl acrylate (MW=234.3, 2.34 g; 0.01 mol), 3-aminopropyl trimethoxysilane (MW=179.3; 1.79 g; 0.01 mol), and MeOH (10 g). The reaction was allowed to proceed first at room temperature for 48 hrs, then at 50° C. for 4 hrs. A solution of 1,4-butane sultone (MW=136.2; 2.72 g; 0.02 mol) and MeOH (10 g) was slowly added to the jar, and the combined reaction mixture was further stirred at 65° C. for 12 hrs. The reaction solution was then concentrated by evaporating off most MeOH, and then slowly added to another screw-top jar containing lithium hydroxide monohydrate (LiOH·H$_2$O; MW=41.96; 0.84 g; 0.02 mmol) and DI water (30 g) with vigorous stirring. The jar was heated up to 50° C. for 4 hrs to allow for hydrolysis of trimethoxysilane groups, resulting in the final product as an aqueous solution.

Compound 12

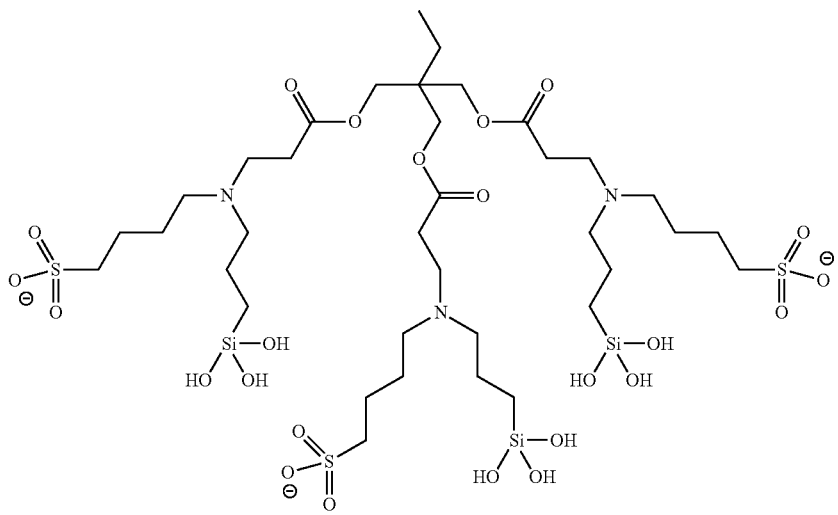 [SMILES: CCC(COC(=O)CCN(CCCCS(=O)(=O)[O-])CCC[Si](O)(O)O)(COC(=O)CCN(CCCCS(=O)(=O)[O-])CCC[Si](O)(O)O)COC(=O)CCN(CCCCS(=O)(=O)[O-])CCC[Si](O)(O)O]

To a round bottom flask was added trimethylolpropane triacrylate (MW=296.3, 9.9 g; 0.033 mol), 3-aminopropyl triethoxysilane (MW=221.4.3; 22.1 g; 0.10 mol), and MeOH (70 g). The reaction was allowed to proceed first at room temperature for 48 hrs, and then at 50° C. for 4 hrs. A solution of 1,4-butane sultone (MW=136.2; 13.6 g; 0.10 mol) and MeOH (70 g) was slowly added to the flask, and the combined reaction mixture was further stirred at 65° C. for 12 hrs. The reaction solution was then concentrated by evaporating off most MeOH, and then slowly added to another screw-top jar containing lithium hydroxide monohydrate (LiOH·H$_2$O; MW=41.96; 4.2 g; 0.10 mol) and DI water (200 g), with vigorous stirring. The jar was heated up to 65° C. for 4 hrs to allow for hydrolysis of triethoxysilane groups, resulting in the final product as an aqueous solution.

A similar procedure of making Compound 12 was followed. To a round bottom flask was added di(trimethylolpropane) tetraacrylate (MW=466.5, 4.7 g; 0.01 mol), 3-aminopropyl triethoxysilane (MW=221.4.3; 8.8 g; 0.04 mol), and MeOH (30 g). The reaction was allowed to proceed first at room temperature for 48 hrs, and then at 50° C. for 4 hrs. A solution of 1,4-butane sultone (MW=136.2; 5.44 g; 0.04 mol) and MeOH (20 g) was slowly added to the flask, and the combined reaction mixture was further stirred at 65° C. for 12 hrs. The reaction solution was then concentrated by evaporating off most MeOH, and then slowly added to another screw-top jar containing lithium hydroxide monohydrate (LiOH·H$_2$O; MW=41.96; 1.68 g; 0.04 mol) and DI water (50 g), with vigorous stirring. The jar was heated up to 65° C. for 4 hrs to allow for hydrolysis of triethoxysilane groups, resulting in the final product as an aqueous solution.

Compound 13

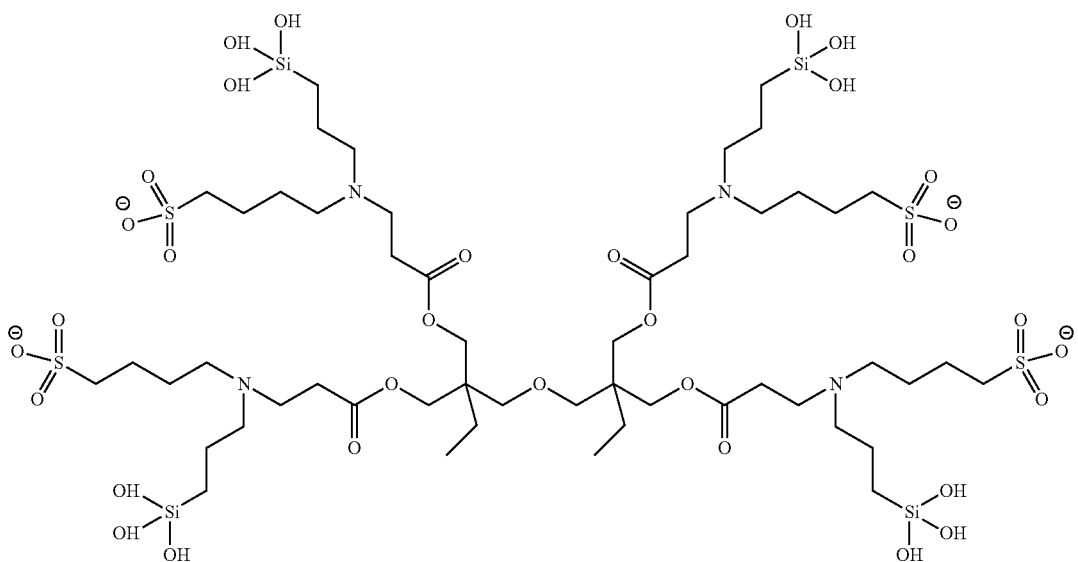 [SMILES: CCC(COCC(CC)(COC(=O)CCN(CCCCS(=O)(=O)[O-])CCC[Si](O)(O)O)COC(=O)CCN(CCCCS(=O)(=O)[O-])CCC[Si](O)(O)O)(COC(=O)CCN(CCCCS(=O)(=O)[O-])CCC[Si](O)(O)O)COC(=O)CCN(CCCCS(=O)(=O)[O-])CCC[Si](O)(O)O]

Compound 14

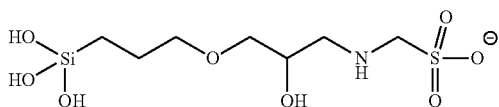 [SMILES: O=S(=O)([O-])CNCC(O)COCCC[Si](O)(O)O]

To a 20-mL vial was added Aminomethanesulfonic acid ($H_2NCH_2SO_3H$; MW=111.1; 1.11 g; 0.01 mol), lithium hydroxide monohydrate (LiOH·$H_2O$; MW=41.96; 0.42 g; 0.01 mol) and DI water (8 g). The solution was stirred at R.T. for 10 min to allow for complete dissolution of solids. In a separate 20-mL vial was mixed with (3-Glycidoxypropyl) trimethoxysilane (MW=236.3, 2.36 g; 0.01 mol) and MeOH (8 mL). The organic solution was then slowly added to the aqueous solution containing the lithium salt of Aminomethanesulfonic acid. The resulting mixture was further stirred at R.T. for 48 hrs. Additional DI water (10 g) was then added to the vial and the solution was heated up to 50° C. for 4 hrs to allow for hydrolysis of trimethoxysilane groups, resulting in a final product as an aqueous silanol solution with about 25% solid.

Compound 15

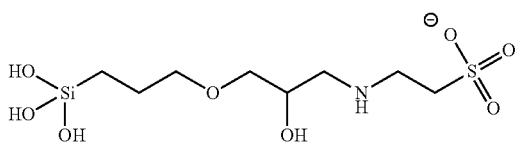 [SMILES: O=S(=O)([O-])CCNCC(O)COCCC[Si](O)(O)O]

A procedure similar to Compound 14 was used to prepare Compound 15. To a screw-top jar was added Taurine (2-Aminoethanesulfonic acid; $H_2NCH_2CH_2SO_3H$; MW=125.2; 12.5 g; 0.10 mol), lithium hydroxide monohydrate (LiOH·$H_2O$; MW=41.96; 4.2 g; 0.1 mol) and DI water (80 g). The solution was stirred at R.T. for 10 min to allow for complete dissolution. In a separate container was added (3-Glycidoxypropyl) trimethoxysilane (MW=236.3, 23.6 g; 0.1 mol) and MeOH (80 mL). The organic solution was then slowly added to the jar containing aqueous taurine solution. The resulting mixture was further stirred at R.T. for 2 days. Additional DI water (100 g) was then added to the jar and the solution was heated up to 50° C. for 4 hrs. Organic solvent was removed, yielding a final product as an aqueous silanol solution with about 25% solid.

Compound 16

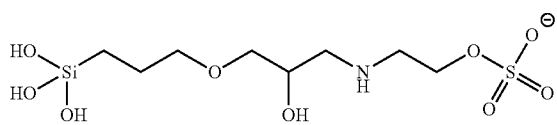 [SMILES: O=S(=O)([O-])OCCNCC(O)COCCC[Si](O)(O)O]

To a 20-mL vial was added 2-Aminoethyl hydrogen sulfate ($H_2NCH_2CH_2OSO_3H$; MW=141.1; 1.41 g; 0.010 mol), lithium hydroxide monohydrate (LiOH·$H_2O$; MW=41.96; 0.41 g; 0.01 mol) and DI water (8 g). The solution was stirred at R.T. for 10 min to allow for complete dissolution. In a separate vial was added (3-Glycidoxypropyl) trimethoxysilane (MW=236.3, 2.36 g; 0.010 mol) and MeOH (8 mL). The organic solution was then slowly added to the jar containing aqueous taurine solution. The resulting mixture was further stirred at R.T. for 2 days. Additional DI water (10 g) was then added to the jar and the solution was heated up to 50° C. for 4 hrs. Organic solvent was removed, yielding a final product as an aqueous silanol solution with about 25% solid.

Compound 17

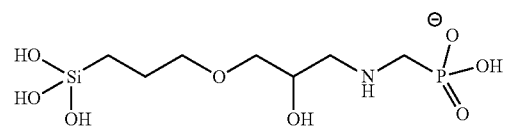 [SMILES: O=P([O-])(O)CNCC(O)COCCC[Si](O)(O)O]

To a 20-mL vial containing sodium hydroxide (NaOH; MW=40.0; 0.20 g; 5 mmol) and DI water (8 g) was added (Aminomethyl)phosphonic acid ($H_2NCH_2PO(OH)_2$; MW=111.0; 0.55 g; 5 mmol). The solution was stirred at R.T. to allow for complete dissolution of solids. The resulting aqueous solution has a pH of about 9. In a separate 20-mL vial was mixed with (3-Glycidoxypropyl) trimethoxysilane (MW=236.3, 1.18 g; 5 mmol) and MeOH (8 mL). The organic solution was then slowly added to the aqueous solution containing aminomethylphosphonate. The resulting mixture was further stirred at R.T. for 48 hrs. Additional DI water (8 g) was then added to the vial and the solution was heated up to 50° C. for 4 hrs to allow for hydrolysis of trimethoxysilane groups, resulting in a final product as an aqueous silanol solution with about 10% solid.

Compound 18

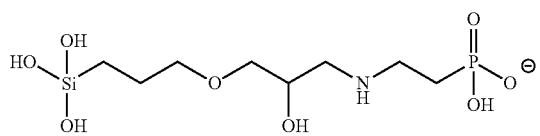 [SMILES: O=P([O-])(O)CCNCC(O)COCCC[Si](O)(O)O]

A procedure similar to Compound 17 was used to prepare Compound 18. To a 20-mL vial containing sodium hydroxide (NaOH; MW=40.0; 0.16 g; 4 mmol) and DI water (8 g) was added 2-Aminoethylphosphonic acid ($H_2NCH_2CH_2PO(OH)_2$; MW=125.1; 0.50 g; 4 mmol). The solution was stirred at R.T. to allow for complete dissolution of solids. The resulting aqueous solution has a pH of about 9. In a separate 20-mL vial was mixed with (3-Glycidoxypropyl) trimethoxysilane (MW=236.3, 0.94 g; 4 mmol) and MeOH (8 mL). The organic solution was then slowly added to the aqueous solution containing 2-aminoethylphosphonate. The resulting mixture was further stirred at R.T. for 48 hrs. Additional DI water (8 g) was then added to the vial and the solution was heated up to 50° C. for 4 hrs to allow for hydrolysis of trimethoxysilane groups. Organic solvents were removed, resulting in the final product as an aqueous silanol solution with about 10% solid.

Compound 19

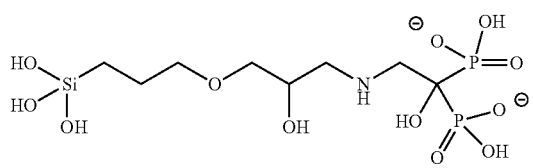 [SMILES: O=P([O-])(O)C(O)(CNCC(O)COCCC[Si](O)(O)O)P(=O)([O-])O]

To a 20-mL vial containing sodium hydroxide (NaOH; MW=40.0; 0.80 g; 20 mmol) and DI water (10 g) was added Alendronic acid (MW=249.1; 2.49 g; 10 mmol). The solution was stirred at R.T. to allow for complete dissolution of solids. The resulting aqueous solution has a pH of about 9. In a separate 20-mL vial was mixed with (3-Glycidoxypropyl) trimethoxysilane (MW=236.3, 2.36 g; 10 mmol) and MeOH (10 mL). The organic solution was then slowly added to the aqueous solution containing Alendronic acid. The resulting mixture was further stirred at R.T. for 48 hrs. Additional DI water (25 g) was then added to the vial and the solution was heated up to 50° C. for 4 hrs to allow for hydrolysis of trimethoxysilane groups. Organic solvents were removed, resulting in the final product as an aqueous silanol solution with about 10% solid.

Compound 20

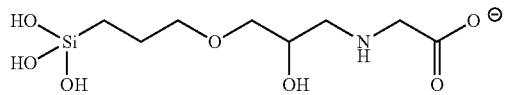 [SMILES: O=C([O-])CNCC(O)COCCC[Si](O)(O)O]

To a 20-mL vial was added Glycine (H$_2$NCH$_2$COOH; MW=75.1; 0.75 g; 10 mmol), lithium hydroxide monohydrate (LiOH·H$_2$O; MW=41.96; 0.21 g; 5 mmol) and DI water (8 g). The solution was stirred at R.T. for 10 min to allow for complete dissolution. The aqueous solution has a pH of about 9. In a separate 20-mL vial was mixed with (3-Glycidoxypropyl) Trimethoxysilane (MW=236.3, 2.36 g; 0.01 mol) and MeOH (8 mL). The organic solution was then slowly added to the aqueous solution containing the aminopropionic acid. The resulting mixture was further stirred at R.T. for 48 hrs. Additional DI water (10 g) was then added to the vial and the solution was heated up to 50° C. for 4 hrs to allow for hydrolysis of trimethoxysilane groups, resulting in a final product as an aqueous silanol solution with about 25% solid.

Compound 21

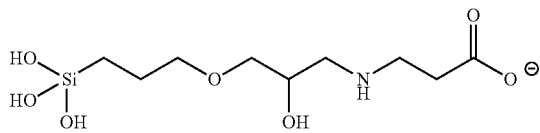 [SMILES: O=C([O-])CCNCC(O)COCCC[Si](O)(O)O]

A procedure similar to Compound 20 was used to prepare Compound 21. To a 20-mL vial was added 3-Aminopropionic acid (H$_2$NCH$_2$CH$_2$COOH; MW=89.1; 0.89 g; 0.01 mol), lithium hydroxide monohydrate (LiOH·H$_2$O; MW=41.96; 0.21 g; 5 mmol) and DI water (8 g). The solution was stirred at R.T. for 10 min to allow for complete dissolution. The aqueous solution has a pH of about 9. In a separate 20-mL vial was mixed with (3-Glycidoxypropyl) Trimethoxysilane (MW=236.3, 2.36 g; 0.01 mol) and MeOH (8 mL). The organic solution was then slowly added to the aqueous solution containing the aminopropionic acid. The resulting mixture was further stirred at R.T. for 48 hrs. Additional DI water (10 g) was then added to the vial and the solution was heated up to 50° C. for 4 hrs to allow for hydrolysis of trimethoxysilane groups, resulting in a final product as an aqueous silanol solution with about 25% solid.

Compound 22

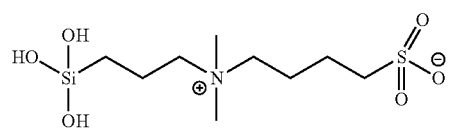 [SMILES: C[N+](C)(CCCCS(=O)(=O)[O-])CCC[Si](O)(O)O]

The compound was prepared as described in Preparative Example 3 of U.S. Pat. No. 9,340,683.

Preparation of Amino-Sulfonate-Silanol Coating Compositions

Coating Composition 1 was prepared as a 4 wt % solution of Compound 1 in water by dilution.

Coating Composition 2 was prepared as a 4 wt % solution of Compound 2 in water by dilution.

Coating Composition 3 was prepared as a 4 wt % solution of a blend of Compound 1:LSS-75 (1:1 w/w) in water.

Coating Composition 4 was prepared as a 4 wt % solution of a blend of Compound 1:LSS-75 (6:4 w/w) in water.

Coating Composition 5 was prepared as a 4 wt % solution of a blend of Compound 2:LSS-75 (1:1 w/w) in water.

Coating Composition 6 was prepared as a 4 wt % solution of a blend of Compound 2:LSS-75 (6:4 w/w) in water.

Coating Composition 7 was prepared as a 4 wt % solution of Compound 3 in water by dilution.

Coating Composition 8 was prepared as a 4 wt % solution of Compound 4 in water by dilution.

Coating Composition 9 was prepared as a 4 wt % solution of a blend of Compound 4:LSS-75 (6:4 w/w) in water.

Coating Composition 10 was prepared as a 4 wt % solution of a blend of Compound 5:LSS-75 (6:4 w/w) in water.

Coating Composition 11 was prepared as a 4 wt % solution of a blend of Compound 6:LSS-75 (6:4 w/w) in water.

Coating Composition 12 was prepared as a 4 wt % solution of a blend of Compound 7:LSS-75 (6:4 w/w) in water.

Coating Composition 13 was prepared as a 2 wt % solution of a blend of Compound 8:LSS-75 (6:4 w/w) in water.

Coating Composition 14 was prepared as a 2 wt % solution of a blend of Compound 9:LSS-75 (6:4 w/w) in water.

Coating Composition 15 was prepared as a 2 wt % solution of Compound 10 in water by dilution.

Coating Composition 16 was prepared as a 2 wt % solution of a blend of Compound 10:LSS-75 (6:4 w/w) in water.

Coating Composition 17 was prepared as a 2 wt % solution of Compound 11 in water by dilution.

Coating Composition 18 was prepared as a 2 wt % solution of a blend of Compound 11:LSS-75 (6:4 w/w) in water.

Coating Composition 19 was prepared as a 2 wt % solution of Compound 12 in water by dilution.

Coating Composition 20 was prepared as a 2 wt % solution of Compound 13 in water by dilution.

Coating Composition 21 was prepared as a 2 wt % solution of Compound 14 in water by dilution.

Coating Composition 22 was prepared as a 2 wt % solution of Compound 15 in water by dilution.

Coating Composition 23 was prepared as a 4 wt % solution of a blend of Compound 15:LSS-75 (6:4 w/w) in water.

Coating Composition 24 was prepared as a 2 wt % solution of Compound 16 in water by dilution.

Coating Composition 25 was prepared as a 2 wt % solution of Compound 17 in water by dilution.

Coating Composition 26 was prepared as a 2 wt % solution of Compound 18 in water by dilution.

Coating Composition 27 was prepared as a 4 wt % solution of a blend of Compound 18:LSS-75 (6:4 w/w) in water.

Coating Composition 28 was prepared as a 2 wt % solution of Compound 19 in water by dilution.

Coating Composition 29 was prepared as a 2 wt % solution of Compound 20 in water by dilution.

Coating Composition 30 was prepared as a 2 wt % solution of Compound 21 in water by dilution.

Coating Composition 31 was prepared as a 4 wt % solution of a blend of Compound 21:LSS-75 (6:4 w/w) in water.

Coating Composition 32 was prepared as a 4 wt % solution of a blend of Compound 22:LSS-75 (6:4 w/w) in water.

General Procedures for the Preparation of Coating Examples

All coating examples were prepared by applying the selected solution containing a silanol compound onto a flexible multi-layer substrate followed by thermal curing in a gas-driven oven. The substrate used herein consists of a bottom layer of PET, a middle layer of hard coating, and a top layer of diamond-like glass (DLG).

The hard coating layer was prepared as generally described in WO 2011/094342. Specifically, a hardcoat solution (35 wt % solid in ethyl acetate) of SR351LV: Nanosilica:MeFBSEA:Esacure One (47.5:47.5:2.5:2.5, w/w) was coated onto a 7-mil-thick W54B white PET film, dried at 60 degrees C. for about 30 seconds, and passed through a UV station and cured with an H bulb having a power 300 W lamp, at 20 ft/minute. The dry thickness of the hard coating on the PET film was about 9 microns.

A DLG layer was deposited onto the cured hard coating surface of the hardcoated PET film prepared as described above using a 2-step web process, as described in U.S. Pat. No. 5,888,594. Specifically, a homebuilt plasma treatment system was used with some modifications: the width of the drum electrode was increased to 42.5 inches (108 cm) and the separation between the two compartments within the plasma system was removed so that all the pumping was carried out by means of the turbo-molecular pump and thus operating at a process pressure of around 10-50 mTorr (1.33-6.7 Pa).

A roll of hardcoated polymeric film from above was mounted within the chamber, the film wrapping around the drum electrode and secured to the take up roll on the opposite side of the drum. The unwind and take-up tensions were maintained at 8 pounds (13.3 N) and 14 pounds (23.3 N) respectively. The chamber door was closed and the chamber was pumped down to a base pressure of 5×10-4 torr (6.7 Pa). For the deposition step, hexamethyldisiloxane (HMDSO) and oxygen were introduced at a flow rate of 200 standard cm$^3$/min and 1000 standard cm3/min respectively, and the operating pressure was nominally at 35 mTorr (4.67 Pa). Plasma was turned on at a power of 9500 watts by applying rf power to the drum and the drum rotation initiated so that the film was transported at a speed of 10 feet/min (3 m/min). The run was continued until the entire length of the film on the roll was completed.

After the completion of the DLG deposition step, the rf power was disabled, the flow of HMDSO vapor was stopped, and the oxygen flow rate increased to 2000 standard cm3/min. Upon stabilization of the flow rate, and pressure, plasma was reinitiated at 4000 watts, and the web transported in the opposite direction at a speed of 10 ft/min (3 m/min), with the pressure stabilizing nominally at 14 mTorr (1.87 Pa). This second plasma treatment step was to remove the methyl groups from the DLG film, and to replace them with oxygen containing functionalities, such as Si—OH groups, which facilitated the grafting of the silane compounds to the DLG film.

After the entire roll of film was treated in the above manner, the rf power was disabled, oxygen flow stopped, chamber vented to the atmosphere, and the roll taken out of the plasma system for further processing.

The thickness of resulting DLG layer was about 100 nm. The porosity of this DLG layer is theoretically zero.

The preparative silanol coating examples were made by applying the indicated silanol coating composition onto the DLG side of the substrate using a #5 Mayer rod, followed by thermally curing at 280° F. (138° C.) for about 3 min. Alternatively, the silanol coatings could be made on a roto coater, by applying the coating solution onto a moving web using a gravure roll with a volume factor of 12 BCM per square inch, followed by passing through a gas-driven oven at 280° F. (138° C.) to allow for drying and curing. The estimated dry thickness of the coating is 100-200 nm.

Examples 1-21

Preparative Example 1 was made from coating composition 1.

Preparative Example 2 was made from coating composition 2.

Preparative Example 3 was made from coating composition 3.

Preparative Example 4 was made from coating composition 4.

Preparative Example 5 was made from coating composition 5.

Preparative Example 6 was made from coating composition 6.

Preparative Example 7 was made from coating composition 7.

Preparative Example 8 was made from coating composition 8.

Preparative Example 9 was made from coating composition 9.

Preparative Example 10 was made from coating composition 10.

Preparative Example 11 was made from coating composition 11.

Preparative Example 12 was made from coating composition 12.
Preparative Example 13 was made from coating composition 13.
Preparative Example 14 was made from coating composition 14.
Preparative Example 15 was made from coating composition 15.
Preparative Example 16 was made from coating composition 16.
Preparative Example 17 was made from coating composition 17.
Preparative Example 18 was made from coating composition 18.
Preparative Example 19 was made from coating composition 19.
Preparative Example 20 was made from coating composition 20.
Preparative Example 21 was made from coating composition 21.
Preparative Example 22 was made from coating composition 22.
Preparative Example 23 was made from coating composition 23.
Preparative Example 24 was made from coating composition 24.
Preparative Example 25 was made from coating composition 25.
Preparative Example 26 was made from coating composition 26.
Preparative Example 27 was made from coating composition 27.
Preparative Example 28 was made from coating composition 28.
Preparative Example 29 was made from coating composition 29.
Preparative Example 30 was made from coating composition 30.
Preparative Example 31 was made from coating composition 31.
Preparative Example 32 was made from coating composition 32.

Cleanability of the surfaces was assessed by testing for permanent marker removability, rating the removability scores on a 1-5 range, for various permanent marks aged at 50° C. overnight. The ratings are assessed with 5 as the best performance, and 1 as the poorest performance. Results are shown in Table 2.

TABLE 2

Summary of permanent marker removability test results.

Removability scores for various permanent markers aged at 50° C. overnight

| | Sharpie Black | Sharpie Red | BIC Black | BIC Blue | Avery Black | Avery Red |
|---|---|---|---|---|---|---|
| Example 1 | 5 | 5 | 5 | 5 | 5 | 4 |
| Example 2 | 5 | 5 | 5 | 5 | 5 | 4 |
| Example 3 | 5 | 5 | 5 | 5 | 5 | 4 |
| Example 4 | 5 | 5 | 5 | 4 | 4 | 4 |
| Example 5 | 5 | 5 | 5 | 5 | 4 | 4 |
| Example 6 | 5 | 5 | 5 | 5 | 5 | 5 |
| Example 7 | 5 | 5 | 5 | 5 | 4 | 4 |
| Example 8 | 5 | 5 | 5 | 5 | 5 | 4 |
| Example 9 | 5 | 5 | 4 | 5 | 4 | 4 |
| Example 10 | 5 | 5 | 5 | 5 | 5 | 4 |
| Example 11 | 5 | 5 | 5 | 5 | 5 | 4 |
| Example 12 | 5 | 5 | 5 | 3 | 4 | 3 |
| Example 13 | 5 | 5 | 5 | 5 | 5 | 5 |
| Example 14 | 5 | 5 | 5 | 5 | 5 | 4 |
| Example 15 | 5 | 5 | 5 | 5 | 5 | 5 |
| Example 16 | 5 | 5 | 5 | 5 | 5 | 4 |
| Example 17 | 5 | 5 | 5 | 5 | 4 | 4 |
| Example 18 | 5 | 5 | 5 | 4 | 5 | 4 |
| Example 19 | 5 | 5 | 5 | 5 | 5 | 5 |
| Example 20 | 5 | 5 | 5 | 5 | 5 | 5 |
| Example 21 | 5 | 5 | 4 | 5 | 5 | 5 |
| Example 22 | 5 | 5 | 4 | 5 | 5 | 5 |
| Example 23 | 5 | 5 | 5 | 5 | 5 | 5 |
| Example 24 | 5 | 5 | 3 | 5 | 5 | 5 |
| Example 25 | 5 | 5 | 4 | 5 | 4 | 4 |
| Example 26 | 5 | 5 | 4 | 5 | 4 | 4 |
| Example 27 | 5 | 5 | 5 | 5 | 4 | 4 |
| Example 28 | 5 | 5 | 3 | 4 | 4 | 4 |
| Example 29 | 5 | 5 | 4 | 5 | 4 | 5 |
| Example 30 | 5 | 5 | 4 | 5 | 4 | 4 |
| Example 31 | 5 | 5 | 5 | 5 | 5 | 4 |
| Example 32 | 5 | 5 | 5 | 5 | 5 | 5 |

Abrasion resistance/scratch resistance, including after water aging, of the surfaces was assessed as described above for some of the Examples 1-21. Results are shown in Table 3.

TABLE 3

Summary of abrasion and aging performance tests results of selected examples.

| Example No. | Coating composition | ScotchBrite Blue Scratch-resistance performance, 1.0 kg, 3,500 cycles | Facial tissue dry abrasion performance, 2.0 kg, a total of 6 rounds with 400 cycles per each round | Permanent marker removability score of aged samples after water soaking for 24 hrs (the lower the better) |
|---|---|---|---|---|
| Example 2 | Compound 2 | No scratch, no stain | No scratch, no stain | 13 |
| Example 6 | Compound 2: LSS-75 = 6/4, w/w | No scratch, no stain | No scratch, no stain | 20 |
| Example 8 | Compound 4 | No scratch, no stain | No scratch, no stain | 11 |
| Example 15 | Compound 10 | No scratch, no stain | No scratch, no stain | 9 |
| Example 19 | Compound 12 | No scratch, no stain | No scratch, no stain | 13 |
| Example 22 | Compound 15 | No scratch, no stain | N/A | N/A |
| Example 23 | Compound 15: LSS-75 = 6/4, w/w | No scratch, no stain | No scratch, no stain | 15 |
| Example 26 | Compound 18 | No scratch, no stain | N/A | N/A |
| Example 27 | Compound 18: LSS-75 = 6/4, w/w | No scratch, no stain | No scratch, no stain | 19 |
| Example 30 | Compound 21 | No scratch, no stain | N/A | N/A |
| Example 31 | Compound 21: LSS-75 = 6/4, w/w | No scratch, no stain | No scratch, no stain | 15 |
| Example 32 | Compound 22 | No scratch, no stain | No scratch, no stain | 18 |

What is claimed is:

1. A silanol compound having the structure

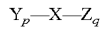

wherein

Y is $[(R^1O)_i R^2_j Si]$, each $R^1$ is hydrogen, each $R^2$ is independently an alkyl group having 1 to 6 carbons, i is an integer between 1 and 3, j is an integer between 0 and 2, and i+j=3;

Z is $[N(R^3)(R^4)-(CH_2)_m-C(G^1_a)-G^2_b]$ wherein each $G^1$ is independently selected from H and OH and each $G^2$ is independently selected from $SO_3$, $OSO_3$, $CO_2$, or a protonated or salt form thereof, a is 0 to 2, b is 1-2, and a+b=3, $R^3$ is hydrogen or an alkyl, aryl, or alkaryl group having 1 to 18 carbons, $R^4$ is an electron pair that is uncoordinated or is coordinated to a hydrogen atom, and m is an integer between 2 and 10;

p and q are independently integers having a value of 1 to 1000, further wherein the ratio of p:q is between 2:1 and 1:10;

each of p moieties Y is the same or different, and each of q moieties Z is the same or different; and X is a linking group comprising covalent bonds linking one or more moieties Y to one or more moieties Z;

or a structure corresponding to one of the following structures 17, 18, or 19 or a protonated form thereof or a salt thereof:

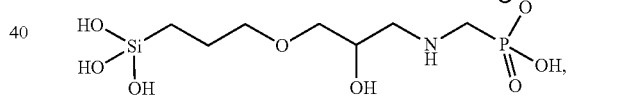

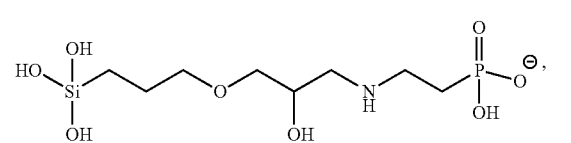

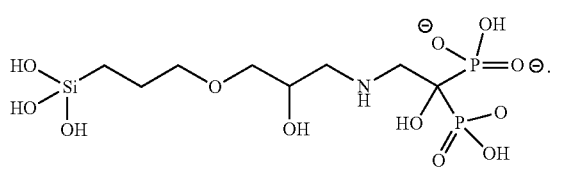

2. The silanol compound of claim 1 wherein one or more $R^4$ is an electron pair that is coordinated to a hydrogen atom.

3. The silanol compound of claim 1 wherein one or more m is 2 or 3.

4. The silanol compound of claim 1, wherein at least one $G^1$ is H.

5. The silanol compound of claim 1, wherein a is 2.

6. The silanol compound of claim 1, wherein at least one $G^2$ is $SO_3$ or a protonated or salt form thereof.

7. The silanol compound of claim 1, wherein X is hydrocarbyl.

8. The silanol compound of claim 1, wherein at least one $G^1$ is OH.

9. The silanol compound of claim 8, wherein exactly one $G^1$ is OH.

10. The silanol compound of claim 1, wherein a is 1.

11. The silanol compound of claim 1, wherein b is 2.

12. The silanol compound of claim 1, wherein X is hydrocarbyl.

13. The silanol compound of claim 1, wherein X is hydrocarbyl interrupted by one O atom.

14. The silanol compound of claim 1, wherein X comprises the moiety —OCH$_2$CH(OH)—CH$_2$—, and wherein the CH$_2$ radical is covalently bonded to a nitrogen atom of Z.

15. The silanol compound of claim 1 wherein p=q=1.

16. A silanol compound, which is any of compound 1 through compound 21:

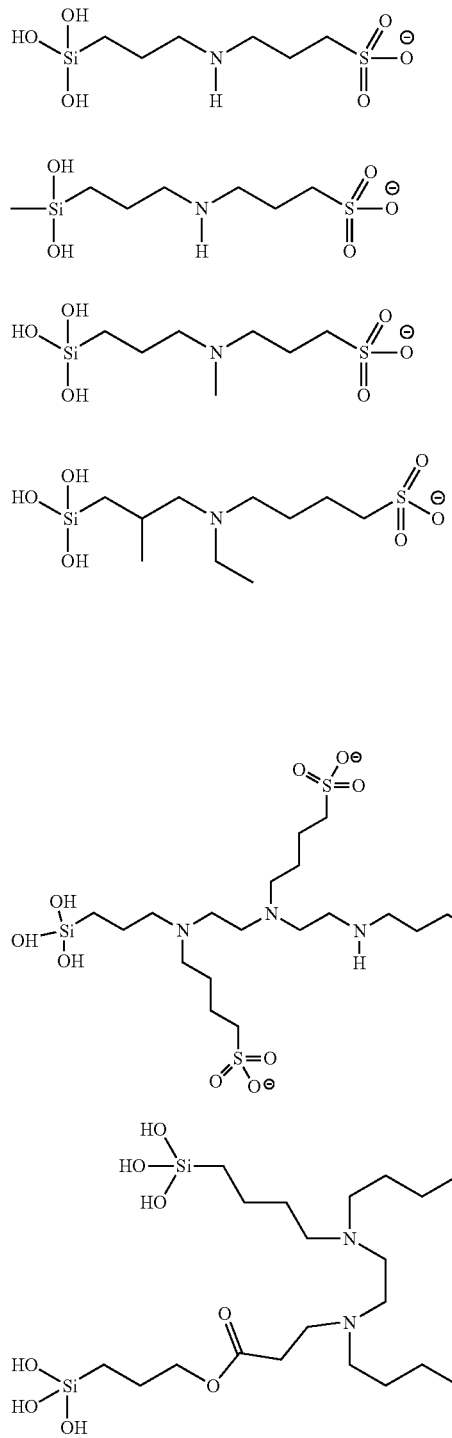

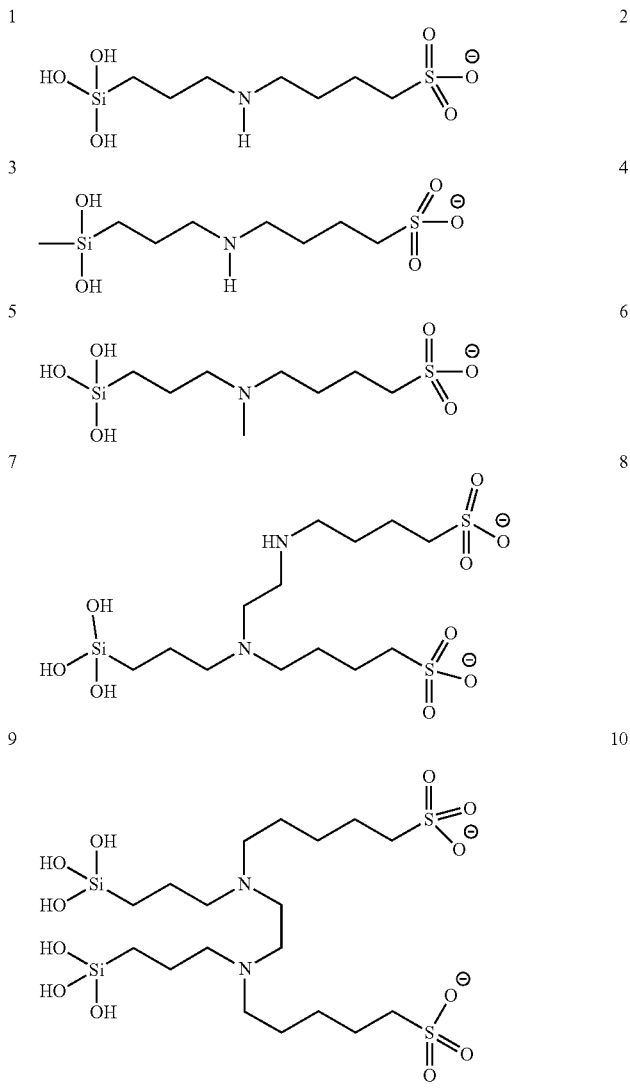

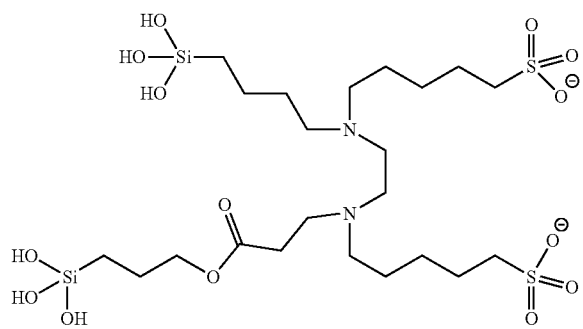

-continued
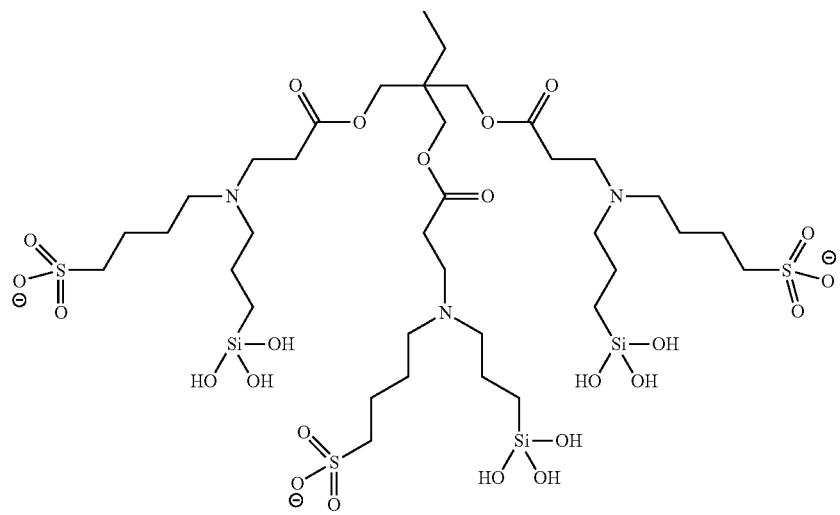
12
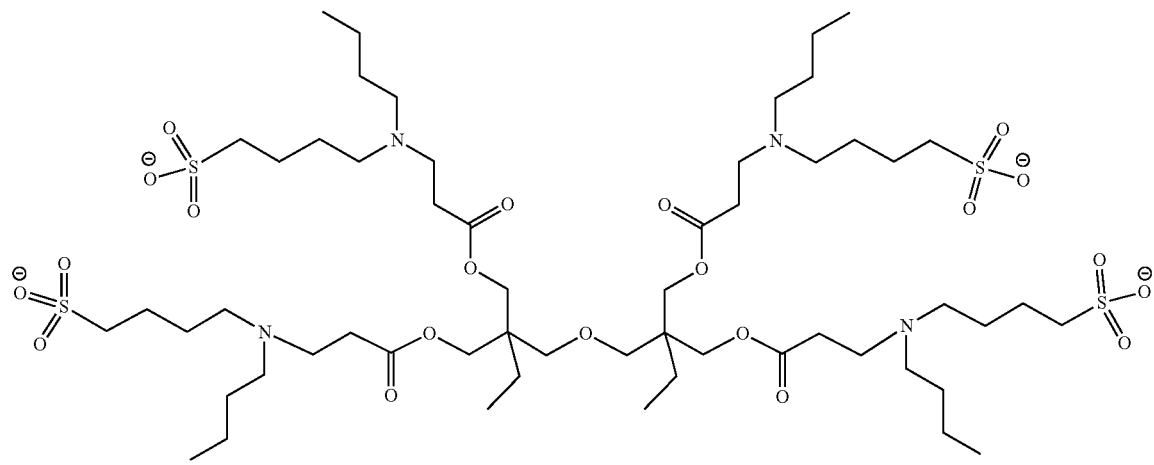
13
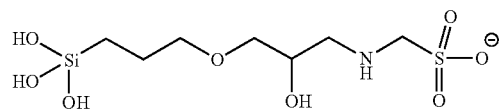
14
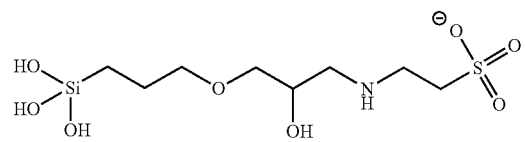
15
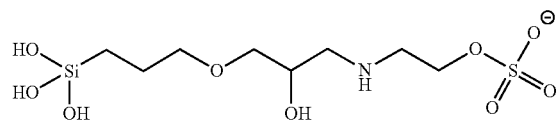
16
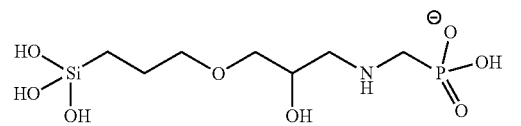
17
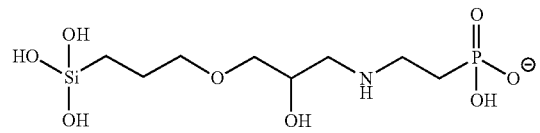
18
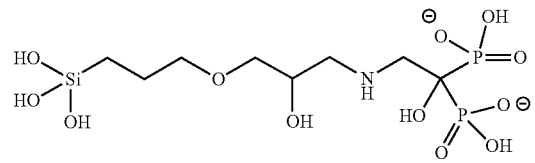
19
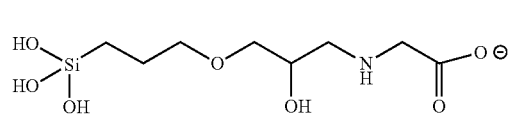
20
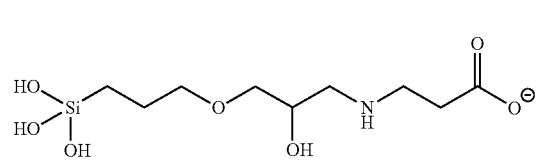
21

17. A composition comprising water and a silanol compound according to claim 1.

18. The composition of claim 17 wherein the silanol compound further comprises a lithium counterion.

\* \* \* \* \*

UNITED STATES PATENT AND TRADEMARK OFFICE
CERTIFICATE OF CORRECTION

PATENT NO. : 12,312,495 B2
APPLICATION NO. : 17/284521
DATED : May 27, 2025
INVENTOR(S) : Jun Ma

Page 1 of 1

It is certified that error appears in the above-identified patent and that said Letters Patent is hereby corrected as shown below:

In the Claims

Column 40

Line 50-55 (approx.), In Claim 1 delete " 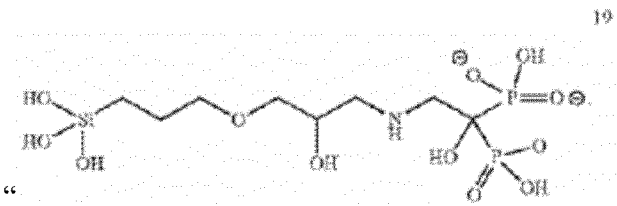 " and 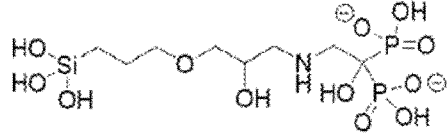 insert -- 19 -- , therefor.

Signed and Sealed this
Sixteenth Day of December, 2025

John A. Squires
*Director of the United States Patent and Trademark Office*